United States Patent
Watanabe et al.

(10) Patent No.: US 9,706,192 B2
(45) Date of Patent: Jul. 11, 2017

(54) IMAGE DISPLAY DEVICE AND IMAGE DISPLAY METHOD

(75) Inventors: Tatsumi Watanabe, Osaka (JP); Nobuyuki Kunieda, Osaka (JP); Ken Mashitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 265 days.

(21) Appl. No.: 14/118,028

(22) PCT Filed: Jun. 20, 2012

(86) PCT No.: PCT/JP2012/004007
§ 371 (c)(1),
(2), (4) Date: Nov. 15, 2013

(87) PCT Pub. No.: WO2012/176446
PCT Pub. Date: Dec. 27, 2012

(65) Prior Publication Data
US 2014/0063209 A1    Mar. 6, 2014

(30) Foreign Application Priority Data

Jun. 20, 2011 (JP) ................. 2011-136637

(51) Int. Cl.
H04N 13/04 (2006.01)
G02B 27/22 (2006.01)
G03B 35/24 (2006.01)

(52) U.S. Cl.
CPC ..... *H04N 13/0402* (2013.01); *G02B 27/2214* (2013.01); *G03B 35/24* (2013.01);
(Continued)

(58) Field of Classification Search
CPC .......... H04N 13/0402; H04N 13/0409; H04N 13/0413; H04N 13/0497; G02B 27/2214; G03B 35/24
See application file for complete search history.

(56) References Cited

U.S. PATENT DOCUMENTS 5,969,850 A * 10/1999 Harrold ............. G02B 27/2214
                                                                                348/E13.004
6,124,920 A *  9/2000 Moseley ............ G02B 27/2214
                                                                                348/E13.004
(Continued)

FOREIGN PATENT DOCUMENTS

CN    1573421 A    2/2005
JP    10-115804    5/1998
(Continued)

OTHER PUBLICATIONS

Office Action issued Jul. 1, 2015 in corresponding Chinese Application No. 201280024589.8 (with English translation of Search Report).
(Continued)

*Primary Examiner* — Thai Tran
*Assistant Examiner* — Christopher T Braniff
(74) *Attorney, Agent, or Firm* — Wenderoth, Lind & Ponack, L.L.P.

(57) ABSTRACT

An image display device includes an image display, an image separator and a controller. The image display displays a plurality of parallax images. The image separator performs optical separation such that the plurality of parallax images which are displayed are viewed as a stereoscopic image. The image separator includes a light-transmitting region (region 0), a light-masking region (region 1) and an intermediate region (region 2) which is located between the light-transmitting region (region 0) and the light-masking region
(Continued)

(region 1). The controller controls light-transmittance of the intermediate region (region 2).

8 Claims, 19 Drawing Sheets

(52) U.S. Cl.
CPC ..... *H04N 13/0409* (2013.01); *H04N 13/0413* (2013.01); *H04N 13/0497* (2013.01)

(56) References Cited

U.S. PATENT DOCUMENTS

| | | | |
|---|---|---|---|
| 6,459,532 | B1 | 10/2002 | Montgomery et al. |
| 7,190,518 | B1 * | 3/2007 | Kleinberger ....... G02B 27/0093 348/57 |
| 2004/0257531 | A1 | 12/2004 | Hattori et al. |
| 2011/0249331 | A1 | 10/2011 | Klippstein et al. |
| 2012/0057108 | A1 | 3/2012 | Okamoto |

FOREIGN PATENT DOCUMENTS

| | | | |
|---|---|---|---|
| JP | 2001-91898 | | 4/2001 |
| JP | 2010-66364 | | 3/2010 |
| JP | 2012-53344 | | 3/2012 |
| WO | 2010/069302 | | 6/2010 |
| WO | WO2010069302 | * | 6/2010 |

OTHER PUBLICATIONS

Goo Hamagishi et al., "Autostereoscopic 3D Displays using Image-Splitter Method", The Institute of Image Information and Television Engineers, vol. 51, No. 7, pp. 1070-1078, 1997 (with English abstract).

International Search Report issued Aug. 7, 2012 in corresponding International Application No. PCT/JP2012/004007.

Ken Mashitani et al., "Parallax Step-Barrier 3D Display", vol. 62, No. 4, 2008, pp. 606-610 (with English abstract).

* cited by examiner

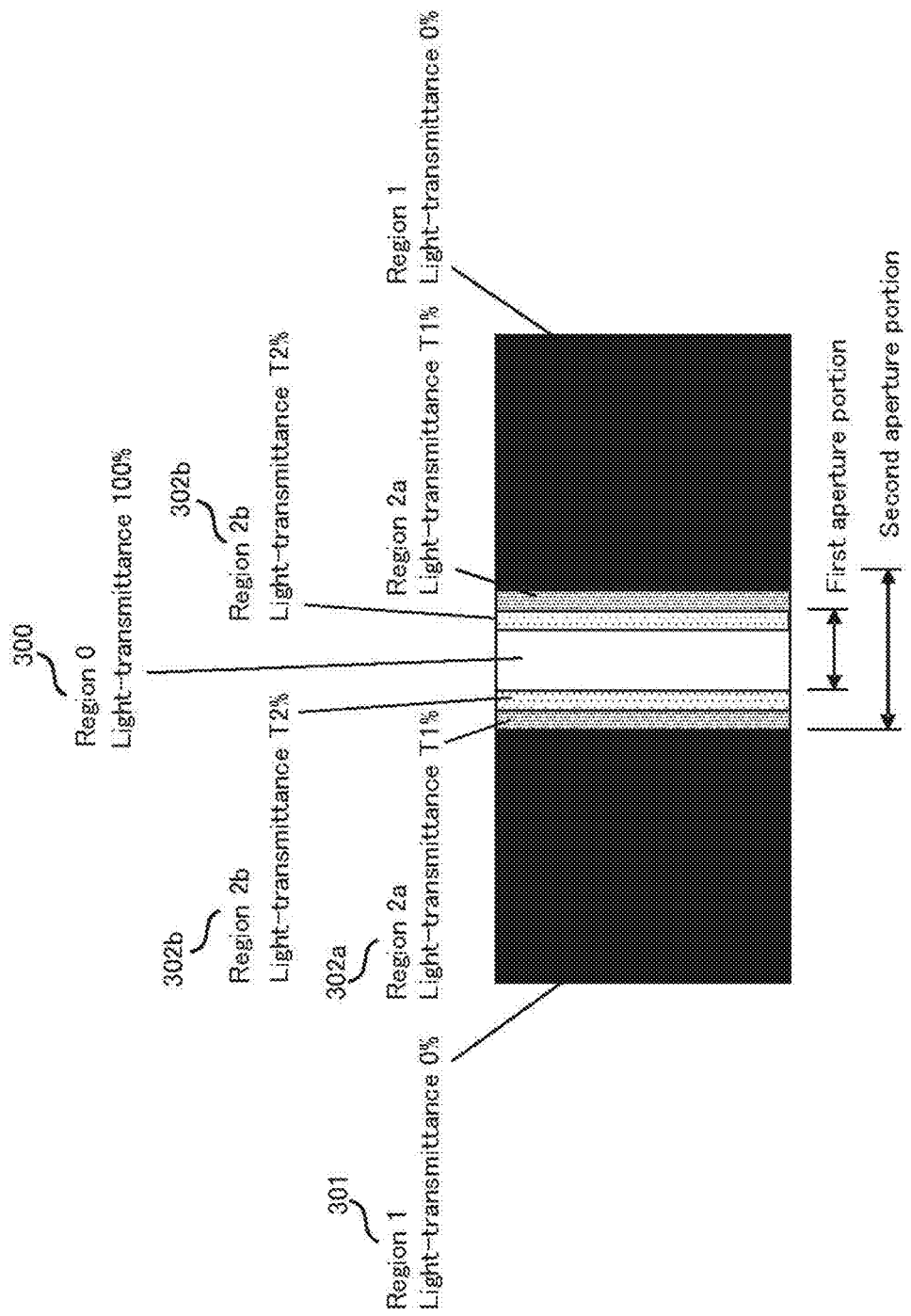

IMAGE DISPLAY DEVICE AND IMAGE DISPLAY METHOD

TECHNICAL FIELD

The present invention relates to an image display device which enables viewing of a stereoscopic image without requiring use specialty glasses.

BACKGROUND ART

Conventionally, in a device for displaying a stereoscopic image which can be viewed without using specialty glasses, a light separator such as a parallax barrier or a lenticular lens is disposed on a viewer side of a display panel such as a liquid-crystal display (LCD) or a plasma display panel (PDP). In the above configuration, the stereoscopic image is displayed through separation of light from a left-view image and light from a right-view image, which are displayed on the display panel, in order to respectively obtain left-eye and right-eye components.

FIG. 16 illustrates an overview of a conventional 3D image generation-display device for naked-eye viewing. Reference sign 1001 indicates a camera 1 (right) and a camera 2 (left) which each capture an image of a subject 1002, but from different viewpoints to one another, thus acquiring a right-view image and a left-view image respectively. In FIG. 16 reference sign 1 indicates the right-view image and reference sign 2 indicates the left-view image. Next, a format converter 1000 generates a composite image of the two viewpoint images, and an image display 1004 displays the composite image in which the left-view image and the right-view image are displayed in alternating columns. In FIG. 16 sub-pixels for viewing by the right eye are indicated by reference sign 1 and sub-pixels for viewing by the left eye are indicated by reference sign 2. The image display 1004 may for example be a PDP, and an image separator 1005 is located at a front surface of the image display 1004. The image separator 1005 is a parallax barrier which includes aperture portions and masking portions arranged in alternation. The aperture portions and the masking portions are arranged such that when a viewer is viewing from a certain position in an image viewing region 1003, a left eye of the viewer only views the left-view image and a right eye of the viewer only views the right-view image. There is a binocular disparity between left-view pixels composing the left-view image and right-view pixels composing the right-view image, such that a person perceives the left-view image and the right-view image as a stereoscopic image. When a viewer in the image viewing region 1003 positions their head at a certain position (front-view position) and the left-view image is projected into the left eye and the right-view image is projected into the right eye, the viewer is able to perceive a stereoscopic image (refer to Non-Patent Literature 1).

CITATION LIST

Non-Patent Literature

[Non-Patent Literature 1]
Autostereoscopic 3D Displays using Image-Splitter Method, Journal of the Institute of Image Information and Television Engineers, Vol. 51, No. 7, pp. 1070-1078, 1997

SUMMARY OF INVENTION

Technical Problem

In order to improve display quality of an image display device, it is necessary to prevent viewing of a shading pattern referred to as Moiré, which is a type of interference fringe pattern.

The present invention aims to provide an image display device which decreases intensity of Moiré.

Solution to Problem

An image display device relating to the present invention comprises: an image display configured to display a plurality of parallax images; an image separator configured to perform optical separation such that the plurality of parallax images which are displayed are viewed as a stereoscopic image, the image separator including a light-transmitting region, a light-masking region and an intermediate region which is located between the light-transmitting region and the light-masking region; and a controller configured to control light-transmittance of the intermediate region.

Advantageous Effects of Invention

Through the image display device relating to the present invention, intensity of Moiré can be reduced by controlling the light-transmittance of the intermediate region.

BRIEF DESCRIPTION OF DRAWINGS

FIG. 19 is a schematic diagram illustrating separator adjustment in an image display device relating to a modified example of the first embodiment.

DESCRIPTION OF EMBODIMENTS

<Background Leading to Embodiments of Present Invention>

In a conventional stereoscopic image display device, an interference fringe pattern (Moiré pattern) occurs between an arrangement pattern of a parallax barrier and a pixel pattern of a PDP. The Moiré pattern varies depending on factors such as width and shape of aperture portions arranged in the parallax barrier.

In general, a liquid-crystal television, PDP or the like has a region referred to as a black matrix provided between R, G and B sub-pixels in order to prevent color mixing. In addition to the black matrix provided between the sub-pixels, auxiliary electrodes and the like may be disposed above each of the sub-pixels. Consequently, depending on viewing position, aperture portions arise through which many black matrices and electrodes are visible (first aperture portions) and aperture portions also arise through which little of the black matrices and electrodes are visible (second aperture portions). Thus, a difference in brightness occurs between the first aperture portions and the second aperture portions. As a result of the above, uneven brightness (Moiré) of the screen occurs, causing a significant problem in image quality distortion.

Occurrence of Moiré is dependent on various factors such as aperture shape and aperture width of the parallax barrier, pixel structure (for example, black matrix size), and viewing distance.

Figure 17:
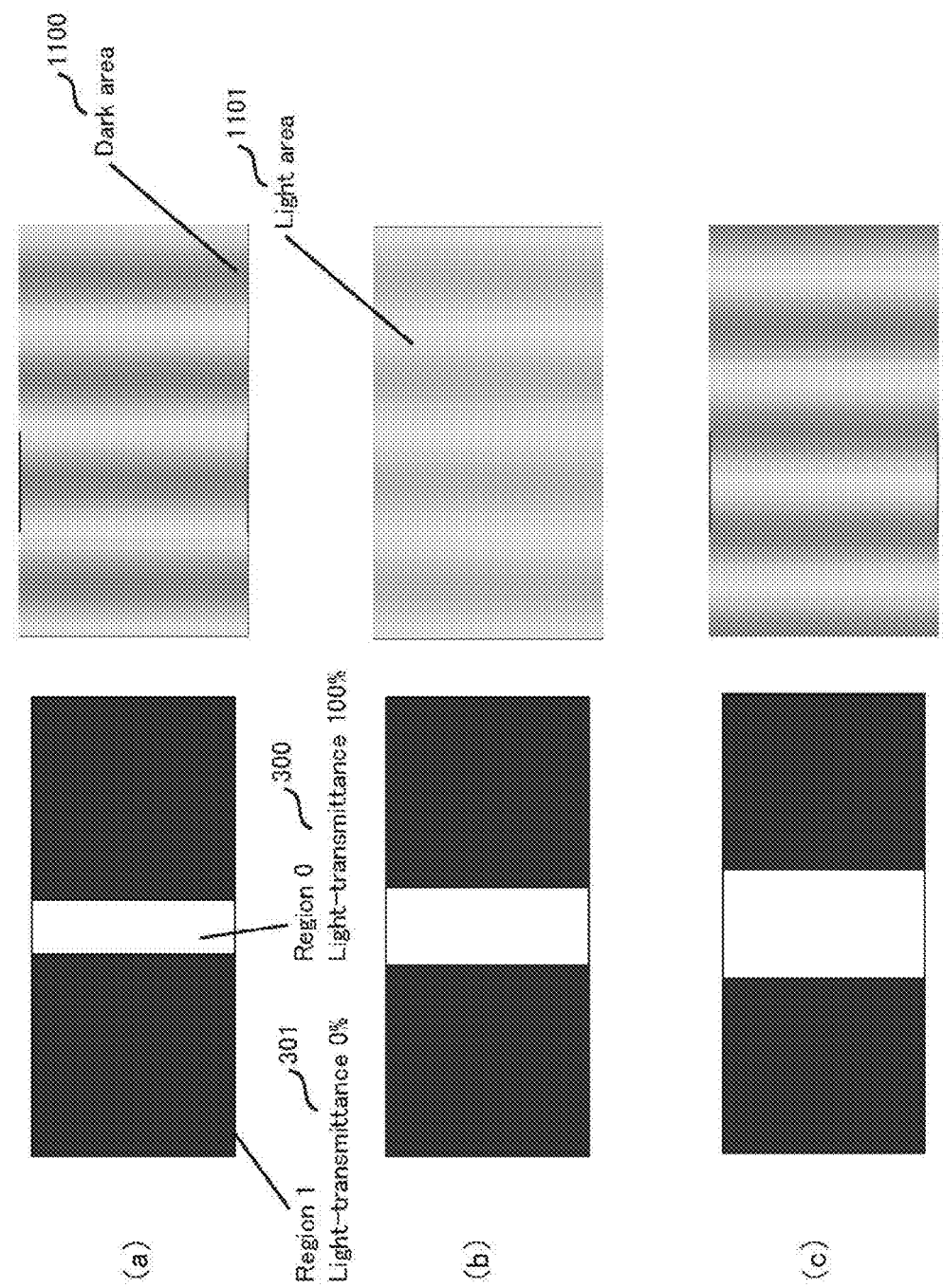
FIG. 17 is a schematic diagram illustrating relationship between Moiré pattern and barrier aperture.

FIG. 17 is a schematic diagram illustrating how a Moiré pattern changes in relation to aperture width when using a vertical stripe parallax barrier. In FIG. 17 an aperture portion of the parallax barrier is illustrated on the left side and a Moiré pattern corresponding to the aperture portion is illustrated on the right side. Reference sign 300 indicates region 0 (light-transmitting region) which has a light-transmittance of 100% and reference sign 301 indicates region 1 (light-masking region) which has a light-transmittance of 0%.

For example, in a configuration in which aperture width of the parallax barrier is the same as pixel size, such as illustrated in section (a) of FIG. 17, an intense Moiré pattern occurs.

When aperture width is increased, such as illustrated in section (b) of FIG. 17, a weak Moiré pattern occurs which is not easily visible.

When aperture width is further increased, such as illustrated in section (c) of FIG. 17, an intense Moiré pattern occurs in which light areas and dark areas are reversed in comparison to the Moiré pattern illustrated in section (a) of FIG. 17.

As explained above, the Moiré pattern which occurs varies in accordance with aperture width of the parallax barrier, therefore in order to reduce intensity of Moiré it is important that aperture width is set to an optimal value.

However, accurate calculation of aperture width in order to completely eliminate Moiré is dependent on complexity of pixel structure and aperture portion shape, and thus accurate calculation is normally difficult to achieve.

Furthermore, accurate reproduction of an aperture width which is intended during design may not in reality be possible during manufacture, thus elimination of Moiré is difficult even if an appropriate aperture width is accurately calculated. For example, an original plate (mask) for use in manufacture may have an error of approximately ±1 μm relative to a designed value. When a parallax barrier is manufactured using the original plate, for example by photolithography, an error on the order of micrometers relative to aperture width of a mask may occur.

In each of the embodiments described below, an image display device is explained in which a parallax barrier includes a light-transmitting region, a light-masking region and an intermediate region located between the light-transmitting region and the light-masking region, and Moiré is reduced by controlling light-transmittance of the intermediate region through control of an electrical voltage applied to the intermediate region.

The following explains a first embodiment, a second embodiment, a third embodiment and a fourth embodiment.

In the first embodiment an image display device is explained which eliminates or significantly reduces intensity of Moiré by controlling electrical voltage applied to a parallax barrier after manufacture.

In the second embodiment an image display device is explained which repeatedly switches a region having variable light-transmittance between a state in which light-transmittance of the region is 0% (masking state) and a state in which light-transmittance of the region is 100% (transmitting state). The switching is performed at a speed which is too quick to be perceived by a viewer.

In the third embodiment an image display device is explained which can vary a masking ratio (T2%) of a region having variable light-transmittance though application of electrical voltage and which performs high-speed switching between a plurality of states of differing light-transmittance.

The fourth embodiment explains an image display device which performs high-speed switching between two states having differing central positions of an aperture portion, by changing an electrical voltage applied to a region having variable light-transmittance.

First Embodiment

Figure 1:
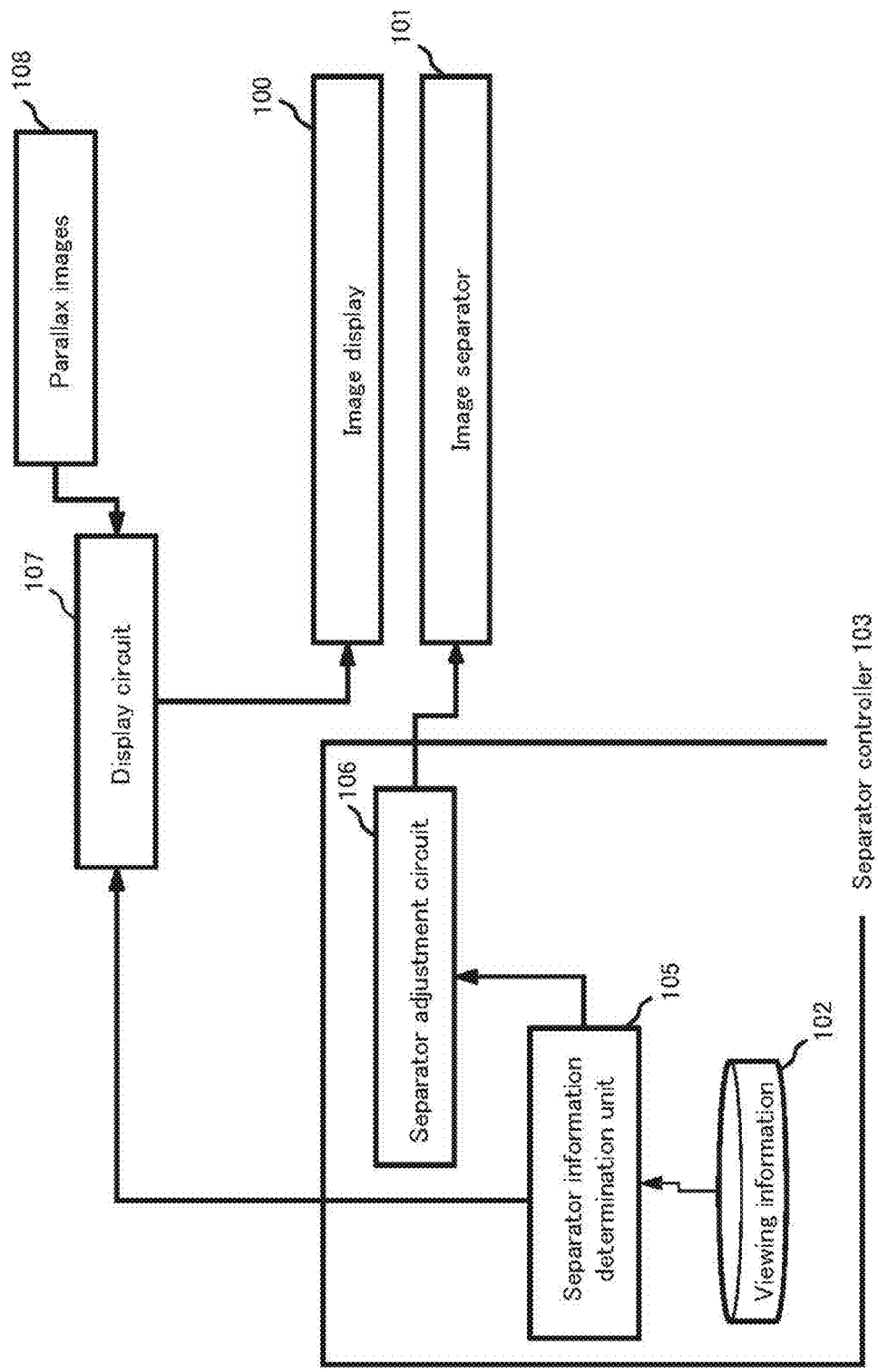
FIG. 1 illustrates configuration of an image display device relating to a first embodiment, a second embodiment, a third embodiment and a fourth embodiment.

FIGS. 1, 2, 3, and 4 illustrate the first embodiment. FIG. 1 illustrates configuration of the image display device relating to the first embodiment. General configuration of image display devices in the second, third and fourth embodiments, described further below, is the same as illustrated in FIG. 1.

Figure 2:
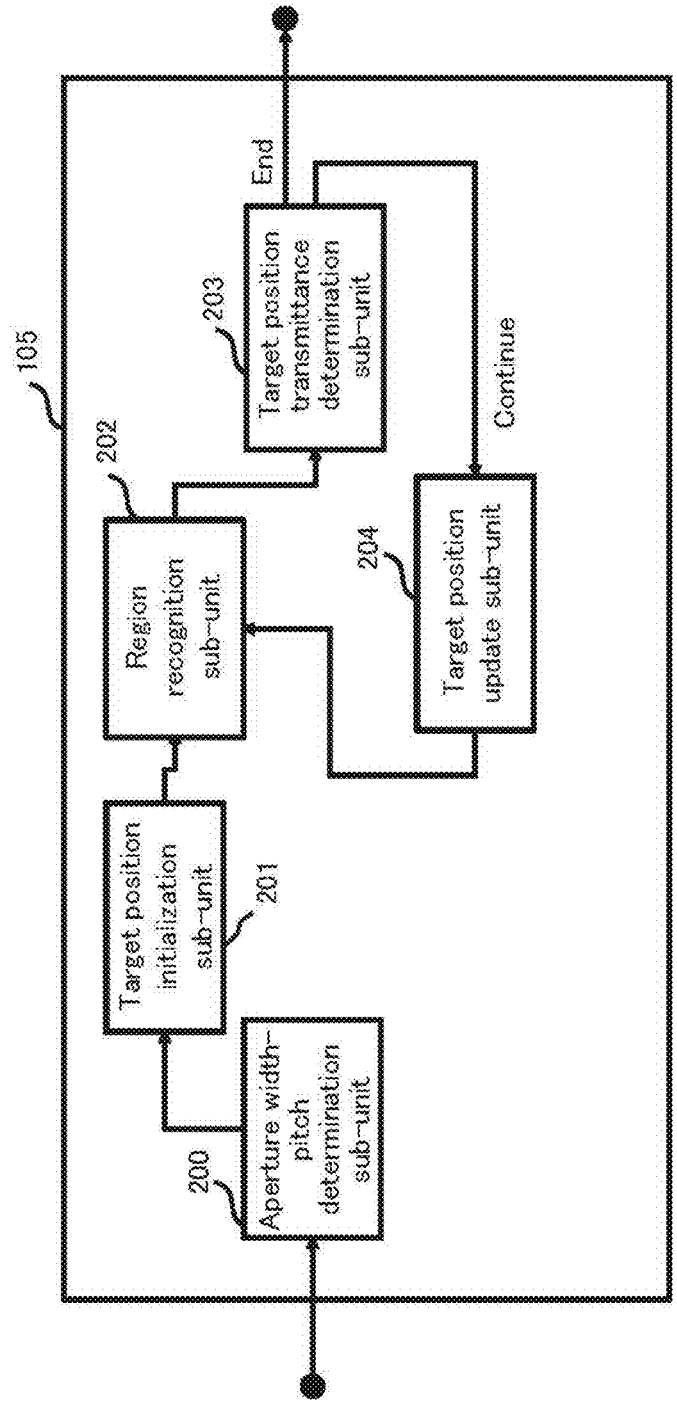
FIG. 2 illustrates configuration of a separator information determination unit in the image display device relating to the first embodiment.
Figure 3:
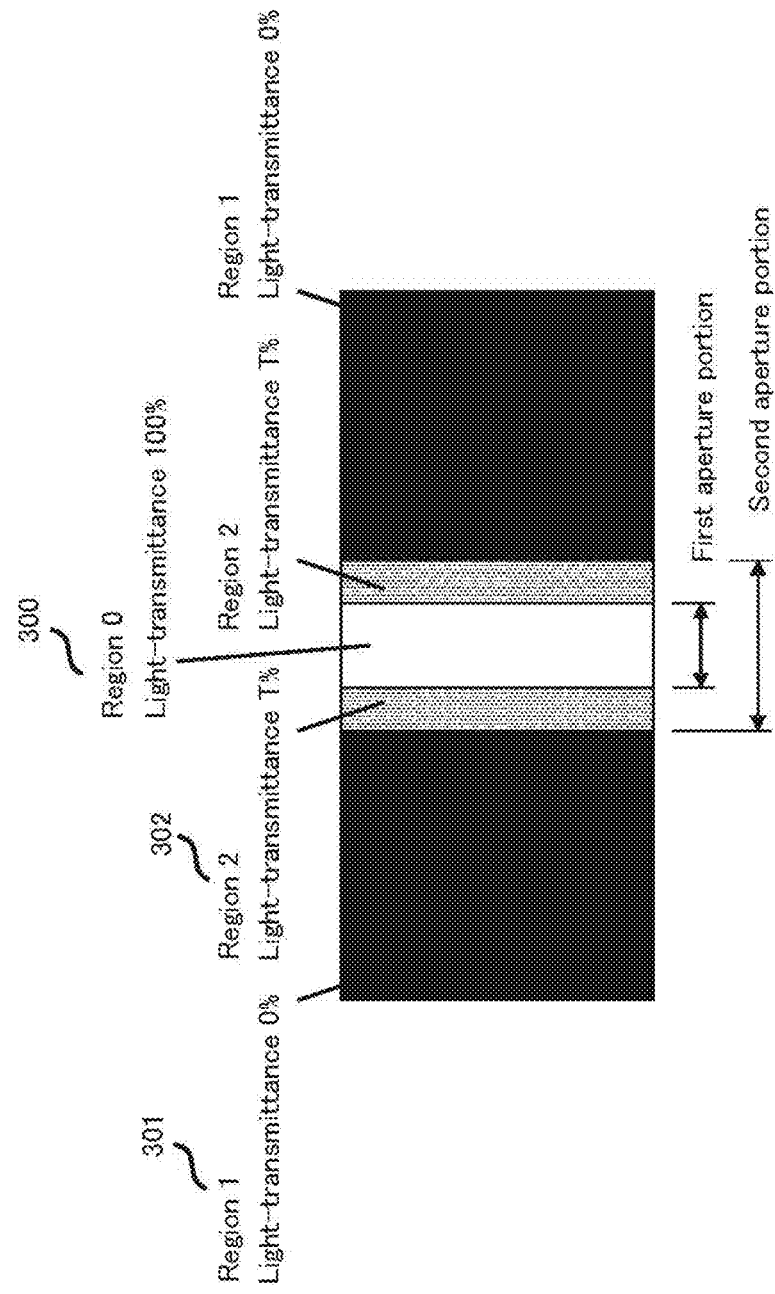
FIG. 3 is a schematic diagram illustrating separator adjustment in the image display device relating to the first embodiment.
Figure 4:
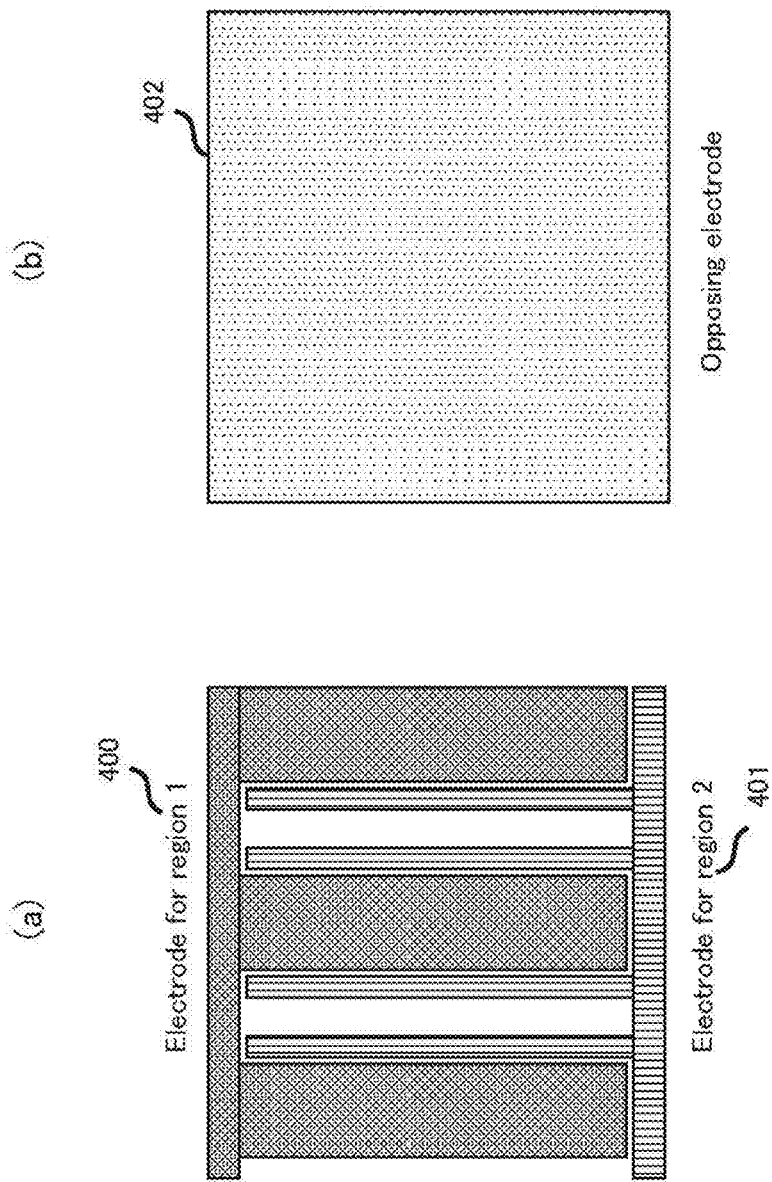
FIG. 4 illustrates an example of electrode structure for implementing separator adjustment in the image display device relating to the first embodiment.

FIG. 2 illustrates configuration of a separator controller 103. FIG. 3 is a schematic diagram illustrating barrier adjustment in a configuration in which a vertical stripe parallax barrier is used as an image separator. FIG. 4 illustrates an example of electrode structure for implementing barrier adjustment illustrated in FIG. 3. The following explains the image display device relating to the first embodiment with reference to FIGS. 1, 2, 3, and 4.

As illustrated in FIG. 1, the image display device relating to the first embodiment includes an image display 100, an image separator 101, the separator controller 103, a display circuit 107 and a plurality of parallax images 108.

The display circuit 107 causes the image display 100 to display the parallax images 108.

The image separator 101 is for example implemented as a parallax barrier (also referred to below simply as a barrier) which transmits or masks light from an image displayed on the image display 100 in order to present a parallax image at a predetermined position.

The separator controller 103 includes a separator information determination unit 105 and a separator adjustment circuit 106. The separator information determination unit 105 determines separator information including information such as aperture width and barrier pitch for each region, based on viewing information 102 such as appropriate viewing distance, the number of parallax images, sub-pixel pitch, barrier-display panel separation and interocular distance (average distance between the eyes). The separator adjustment circuit 106 for example adjusts barrier position and distance between the barrier and the image display 100 based on the separator information determined by the separator information determination unit 105.

The separator controller 103 includes the separator information determination unit 105, which determines information such as aperture width and barrier pitch for each region based on the viewing information 102, and the separator adjustment circuit 106, which adjusts barrier-display panel separation, barrier position and the like based on the separator information determined by the separator information determination unit 105.

As illustrated in FIG. 2, the separator information determination unit 105 includes an aperture width-pitch determination sub-unit 200, a target position initialization sub-unit 201, a region recognition sub-unit 202, a target position transmittance determination sub-unit 203 and a target position update sub-unit 204. The aperture width-pitch determination sub-unit 200 for example determines barrier pitch and widths of a first aperture portion and a second aperture portion illustrated in FIG. 3. The target position initialization sub-unit 201 sets an initial position in terms of a horizontal direction. The region recognition sub-unit 202 judges whether a current target position in the horizontal direction is included in region 0, region 1 or region 2 illustrated in FIG. 3. The target position transmittance determination sub-unit 203 determines a light-transmittance x % in accordance with each of the regions. The target position update sub-unit 204 updates the target position in the horizontal direction when light-transmittance has not yet been judged at all positions in the horizontal direction. The aperture width-pitch determination sub-unit 200 may set widths of the first aperture portion and the second aperture portion as default values (note that width of the second aperture portion is greater than width of the first aperture portion), or alternatively may set the widths as values selected in advance based on conditions relating to a viewing environment.

In the present embodiment, the parallax barrier configuring the image separator 101 includes region 1, which is a region in a masking state (0% light-transmittance), region 0, which is a region in a transmitting state (100% light-transmittance), and region 2, which is a region located between regions 0 and 1 and having variable light-transmittance which can be controlled. Each of regions 0, 1 and 2 is configured (for example, using a TFT liquid-crystal material) such that masking ratio and aperture ratio (light-transmittance) thereof can be varied through application of electrical voltage.

Applied electrical voltage is adjusted such that region 0 is in the transmitting state (100% light-transmittance) and such that region 1 is in the masking state (0% light-transmittance). On the other hand, light-transmittance T % of region 2 can be varied based on electrical voltage which is applied thereto.

In FIG. 3, when light-transmittance T % of region 2 is 0% (masking state), an aperture portion is as indicated by the first aperture portion and a Moiré pattern occurs such as illustrated in section (a) of FIG. 17. On the other hand, when light-transmittance T % of region 2 is 100% (transmitting state), an aperture portion is as indicated by the second aperture portion and a Moiré pattern occurs such as illustrated in section (c) of FIG. 17. By varying an electrical voltage applied to region 2, light-transmittance of region 2 can be varied such that transition occurs between a state in which a Moiré pattern occurs such as illustrated in section (a) of FIG. 17 and a state in which a Moiré pattern occurs such as illustrated in section (c) of FIG. 17. Intermediate between the two different states illustrated in sections (a) and (c) of FIG. 17 exists a state in which Moiré can be eliminated, therefore by varying electrical voltage applied to region 2 such that the light-transmittance T % is an appropriate value, a state can be achieved in which Moiré is eliminated or significantly reduced in intensity.

For example, in a situation in which width of the first aperture portion is equal to sub-pixel pitch (i.e., sub-pixel pitch multiplied by a factor of 1) and width of the second aperture portion is double sub-pixel pitch (i.e., sub-pixel pitch multiplied by a factor of 2), by setting light-transmittance T % of region 2 as 50%, average aperture width is effectively equal to sub-pixel pitch multiplied by a factor of 1.5.

Therefore, even if an aperture width appropriate for eliminating Moiré cannot be accurately calculated, Moiré can still be eliminated or significantly reduced in intensity after manufacture of the parallax barrier, by controlling light-transmittance T % of region 2 through control of applied electrical voltage as explained above. Furthermore, even in a situation in which an appropriate aperture width can be accurately calculated but designed width cannot be accurately reproduced during manufacture, by manufacturing the parallax barrier while considering accuracy of manufacture such that width of the first aperture portion causes the state illustrated in section (a) of FIG. 17 and width of the second aperture portion causes the state illustrated in section (c) of FIG. 17, Moiré can still be eliminated or significantly reduced in intensity through control of applied electrical voltage.

FIG. 4 illustrates an example of electrode structure for the parallax barrier in order to implement barrier adjustment illustrated in FIG. 3. Arrangement of liquid-crystals between electrodes formed on two different substrates is controlled through application of electrical voltage between the electrodes. As illustrated in section (a) of FIG. 4, an electrode 400 for region 1 and an electrode 401 for region 2 are formed on one of the substrates. As illustrated in section (b) of FIG. 4, an opposing electrode 402 is formed over an entire surface of the other substrate. Region 1 is switched between the masking state and the transmitting state through application of electrical voltage between the electrode 400 for region 1 and the opposing electrode 402. Also, light-transmittance of region 2 is controlled by applying electrical voltage between the electrode 401 for region 2 and the opposing electrode 402, and by varying the aforementioned electrical voltage. Through use of an electrode structure such as explained above, barrier adjustment can be implemented such as illustrated in FIG. 3.

FIG. 4 illustrates an example of electrode structure required for controlling light-transmittance of regions 1 and 2. However, alternatively electrode structure in section (a) of FIG. 4 may further include an electrode for region 0 in order to control light-transmittance of region 0.

Figure 5:
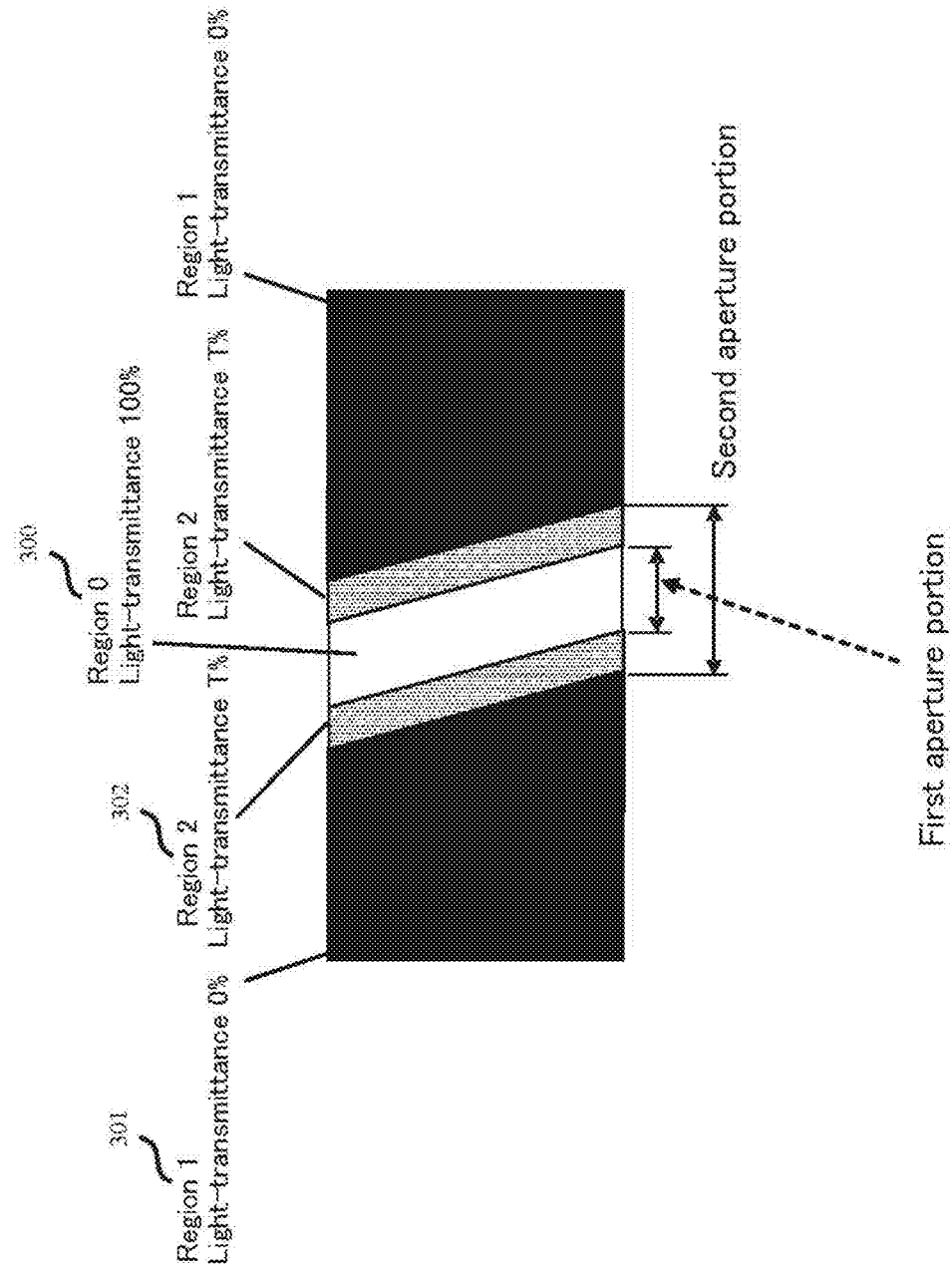
FIG. 5 illustrates separator adjustment in a configuration in which a slanting (diagonal) parallax barrier is used in the image display device relating to the first embodiment.

The above explanation uses an example in which the parallax barrier has a vertical stripe type structure, but alternatively the parallax barrier may have a slanting (diagonal) type structure such as illustrated in FIG. 5.

In FIG. 5 region 2 is composed of two regions located at opposite edges of region 0, sandwiching region 0 therebetween. Also, in FIG. 5 region 0 and the two regions composing region 2 are inclined in the same diagonal direction, forming a slanted striped pattern.

In FIG. 3, regions 0, 1 and 2 are each configured using a liquid-crystal material or the like such that masking ratio and aperture ratio (light-transmittance) thereof can be varied through application of electrical voltage. Alternatively, in order that region 0 is constantly in the transmitting state (100% light-transmittance), region 0 may be provided as a constant aperture or a material through which transmittance of light is approximately complete, such as glass, may be disposed in region 0. In the above configuration, only regions 1 and 2 are configured such that masking ratio and aperture ratio (light-transmittance) thereof can be varied through application of electrical voltage.

The present embodiment is explained using an example in which the image display is a PDP, but the image display may alternatively be a different type of display such as an LCD or an electroluminescence (EL) display.

In the present embodiment an example of configuration is explained in which the image separator is located in front of the front surface of the image display. In an alternative configuration, the image separator may be a parallax barrier which is located between a liquid-crystal panel and a backlight of an LCD. Furthermore, in an alternative configuration only region 2, which implements a region with light-transmittance T %, may be configured using a liquid-crystal material or the like such that light-transmittance thereof can be varied through application of electrical voltage. In the above configuration, region 0 is an aperture portion which is constantly in the transmitting state and a fixed structure (for example, masked glass or film) is provided in region 1 such that region 1 is constantly in the masking state. Configuring regions 0 and 1 as described above has an advantageous effect of reducing manufacturing costs and electricity consumption.

Second Embodiment

Figure 6:
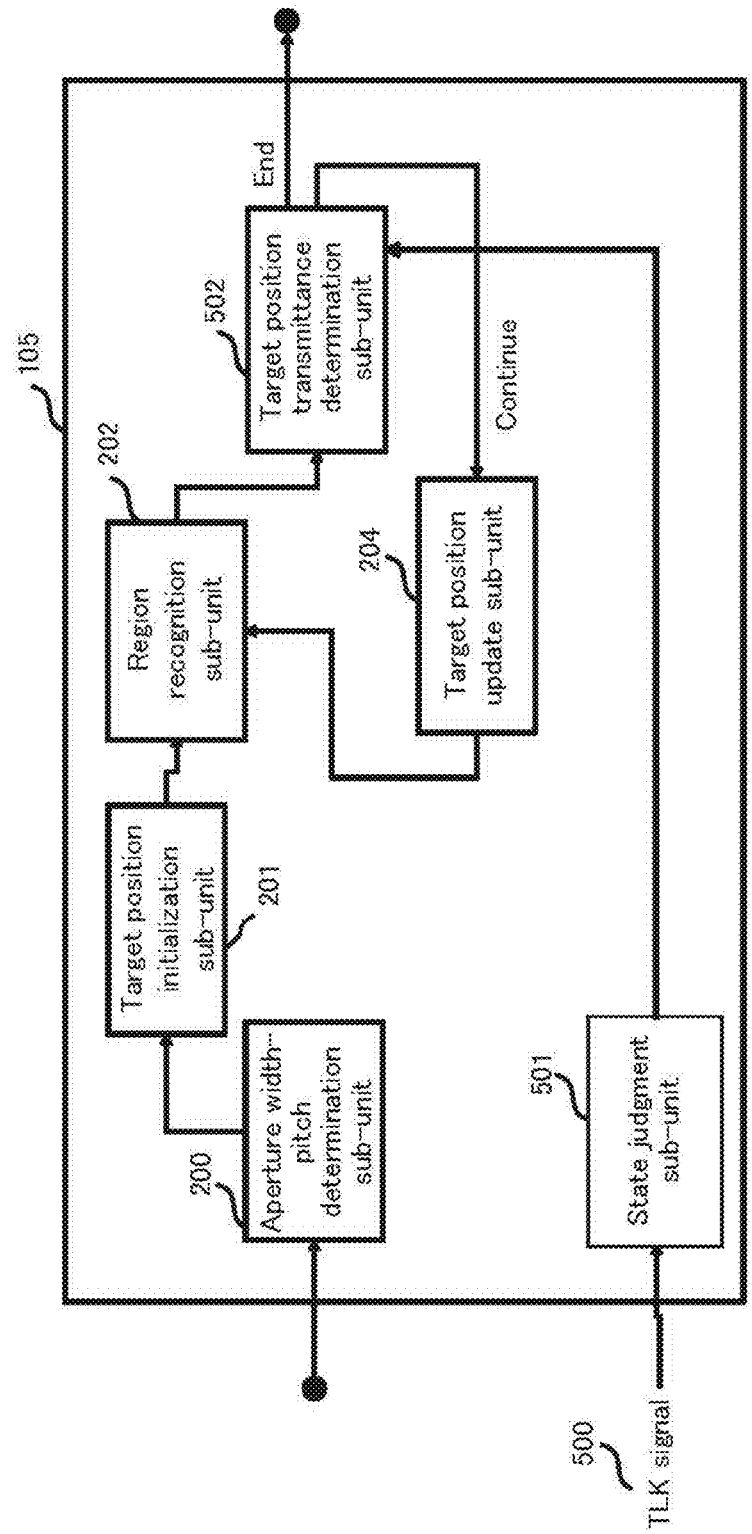
FIG. 6 illustrates configuration of a separator adjustment determination unit in the image display device relating to the second embodiment, the third embodiment and the fourth embodiment.
Figure 7:
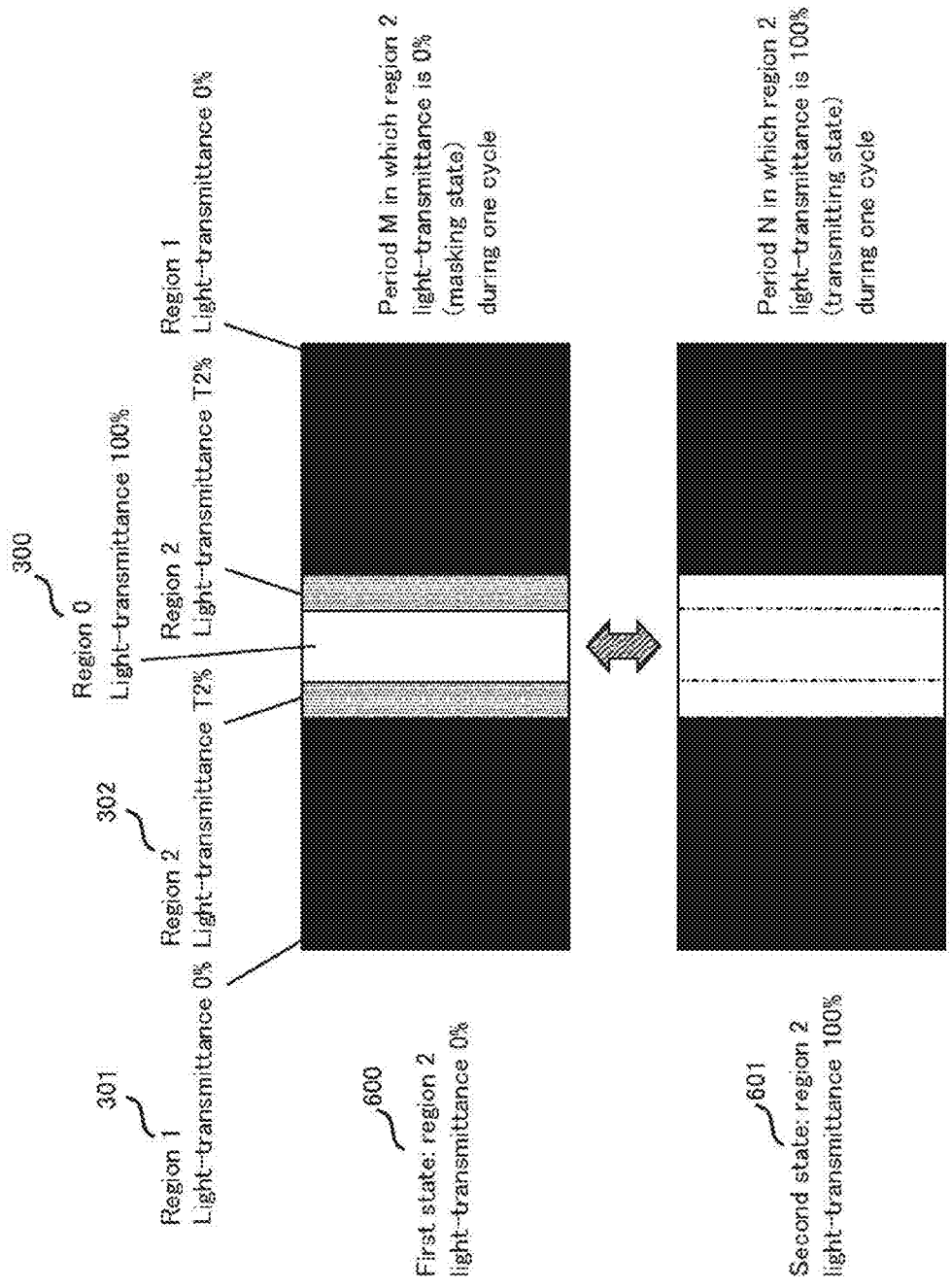
FIG. 7 is a schematic diagram illustrating separator adjustment in the image display device relating to the second embodiment.

FIGS. 1, 6, and 7 illustrate the second embodiment. FIG. 6 illustrates configuration of a separator information determination unit in the image display device relating to the second embodiment. FIG. 7 is a schematic diagram illustrating barrier adjustment when a vertical stripe parallax barrier is used to implement an image separator in the second embodiment. In the same way as in the first embodiment, each of regions 0, 1 and 2 is configured (for example, using a TFT liquid-crystal material) such that masking ratio and aperture ratio (light-transmittance) thereof can be varied through application of electrical voltage.

In the present embodiment, two different states (first state and second state) may be adopted such as illustrated in FIG. 7. In the first state, region 2 is in a masking state (0% light-transmittance) and in the second state, region 2 is in a transmitting state (100% light-transmittance). The present embodiment is configured such that high-speed switching can be performed between the two states.

Consequently, as illustrated in FIG. 6, a state judgment sub-unit 501 judges which state to switch to in accordance with input of an internal timing signal such as a TLK signal. Alternatively, the state judgment sub-unit 501 may judge whether to switch to the first state or the second state based on a processing counter.

A target position transmittance determination sub-unit 502 determines light-transmittance of a target position in the horizontal direction, based on the target position and the state judged by the state judgment sub-unit 501 in accordance with the TLK signal. Also, as illustrated in FIG. 7, only light-transmittance of region 2 is controlled in accordance with the TLK signal. Applied electrical voltage is adjusted such that region 0 is in a transmitting state (100% light-transmittance) and region 1 is in a masking state (0% light-transmittance) regardless of the TLK signal, in the same way as in the first embodiment.

In terms of electrode structure, the electrode structure illustrated in FIG. 4 for the first embodiment may for example be used.

Switching of region 2 between the two states using the TLK signal or the processing counter should preferably be imperceptible to a viewer. For example, preferably switching of region 2 between the masking state (first state) and the transmitting state (second state) should be repeated at a frequency in a range of 120 Hz to 240 Hz.

An average light-transmittance is determined based on a ratio of time in the masking state to time in the transmitting state (duty ratio of the masking state and the transmitting state) during one cycle of cyclical repetition of the masking state and the transmitting state. For example, when a duty ratio of the masking state and the transmitting state is 1:1, average light-transmittance of region 2 during one cycle is 50%. The above value can be regarded as a light-transmittance T2% of region 2 during the one cycle. When a duty ratio of the masking state and the transmitting state is M:N, average light-transmittance T2% during one cycle is as shown below in MATH 1.

[MATH 1]

$$T2 = N/(N+M) \times 100 \tag{1}$$

As explained above, when the duty cycle of the masking state and the transmitting state is M:N, average light-transmittance during one cycle can be regarded as light-transmittance T2% of region 2 during the one cycle, and by adjusting M and N in order to achieve an appropriate value for T2, Moiré can be eliminated or significantly reduced in intensity. In other words, Moiré can be reduced by temporal mixing of aperture patterns in which light and dark areas in a Moiré patterns corresponding thereto are reversed relative to one another.

The above explanation uses an example in which the parallax barrier has a vertical stripe type structure, but alternatively the parallax barrier may have a slanting (diagonal) type structure such as explained in the first embodiment.

In FIG. 7, regions 0, 1 and 2 are each configured using a liquid-crystal material or the like such that masking ratio and aperture ratio (light-transmittance) thereof can be varied through application of electrical voltage. Alternatively, in order that region 0 is constantly in the transmitting state (100% light-transmittance), region 0 may be provided as a constant aperture or a material through which transmittance of light is approximately complete, such as glass, may be provided in region 0. In the above configuration, only regions 1 and 2 are configured such that masking ratio and aperture ratio (light-transmittance) thereof can be varied through application of electrical voltage.

The present embodiment is explained using an example in which the image display is a PDP, but the image display may alternatively be a different type of display such as an LCD or an EL display.

In the present embodiment an example of configuration is explained in which the image separator is located in front of the front surface of the image display. In an alternative configuration, the image separator may be a parallax barrier which is located between a liquid-crystal panel and a backlight of an LCD. Furthermore, in an alternative configuration only region 2, which implements a region with average light-transmittance T2% during one cycle, may be configured using a liquid-crystal material or the like such that light-transmittance thereof can be varied through application of electrical voltage. In the above configuration, region 0 is an aperture potion which is constantly in the transmitting state and a fixed structure (for example, masked glass or film) is provided in region 1 such that region 1 is constantly in the masking state.

Third Embodiment

Figure 8:
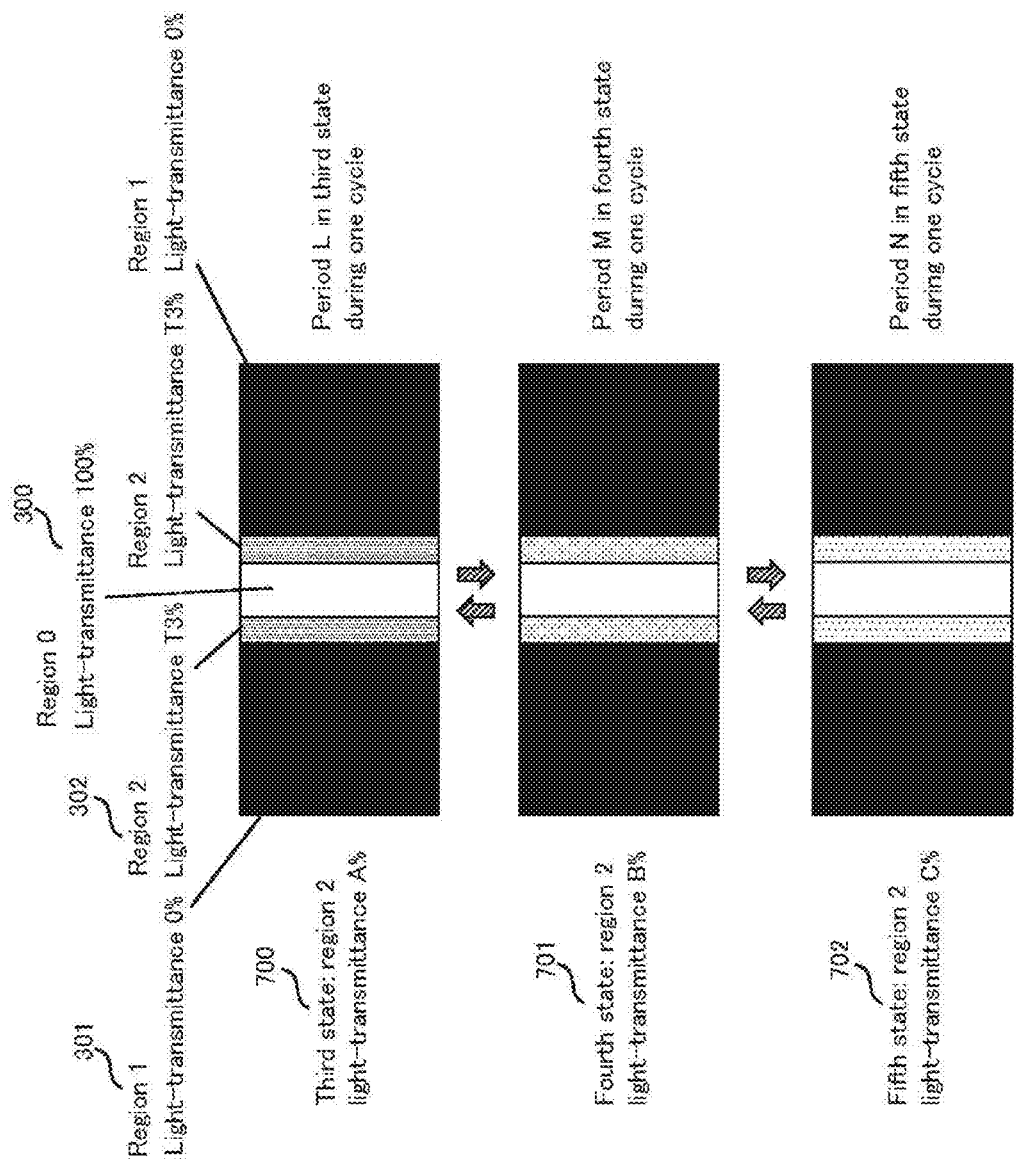
FIG. 8 is a schematic diagram illustrating separator adjustment in the image display device relating to the third embodiment.

FIGS. 1, 6, and 8 illustrate the third embodiment. FIG. 8 is a schematic diagram illustrating barrier adjustment when a vertical stripe barrier is used to implement an image separator in the third embodiment. In the same way as in the first embodiment, regions 0, 1 and 2 are each configured (for example, using a TFT liquid-crystal material) such that masking ratio and aperture ratio (light-transmittance) thereof can be varied through application of electrical voltage. In the present embodiment, an electrode structure for implementing barrier adjustment illustrated in FIG. 8 is the same as illustrated for the first embodiment in FIG. 4. However, a method of control of region 2 in the present embodiment differs from in the first embodiment and the second embodiment. In the present embodiment region 2 can be varied between a plurality of different light-transmittances through application of electrical voltage and high-speed switching can be performed between states corresponding to the different light-transmittances. FIG. 8 illustrates an example in which region 2 can be switched between three different states (third state, fourth state and fifth state). In FIG. 8, region 2 has light-transmittance A % in the third state, light-transmittance B % in the fourth state and light-transmittance C % in the fifth state, thus through application of electrical voltage region 2 can adopt a plurality of states which differ in terms of light-transmittance. Furthermore, high-speed switching can be performed between the three states.

As illustrated in FIG. 6, in order to implement the above, high-speed switching is performed in accordance with an internal timing signal such as a TLK signal. The target position transmittance determination sub-unit 502 determines light-transmittance of a target position in the horizontal direction in accordance with the target position and the TLK signal. Also, as illustrated in FIG. 8, only light-transmittance of region 2 is controlled in accordance with the TLK signal. Applied electrical voltage is adjusted such that region 0 is in a transmitting state (100% light transmittance) and region 1 is in a masking state (0% light-transmittance) regardless of the TLK signal, in the same way as in the first embodiment and the second embodiment.

Preferably switching between the three states should be imperceptible to a viewer. For example, the three states are switched between repeatedly at a frequency in a range of 120 Hz to 240 Hz. In the same way as described in the second embodiment, an average light-transmittance of region 2 during one cycle of cyclical repetition of the third, fourth and fifth states is determined by a ratio of time in the third state, time in the fourth state and time in the fifth state (duty ratio of the third state, the fourth state and the fifth state) and light-transmittance of region 2 in each of the aforementioned states. The average light-transmittance can be regarded as light-transmittance T3% of region 2 during the one cycle.

For example, the third state has light-transmittance A %, the fourth state has light-transmittance B % and the fifth state has light-transmittance C %, thus when duty ratio of the third state, the fourth state and the fifth state is L:M:N, average light-transmittance is as shown below in MATH 2.

[MATH 2]

$$T3=(L \times A+M \times B+N \times C)/(L+M+N) \qquad (2)$$

T3 is equal to T2, and thus average light-transmittance is equal to in the second embodiment, when L=0, A=0, B=0 and C=100. Average light-transmittance calculated using MATH 2 can be regarded as light-transmittance T3% of region 2, thus by adjusting values for A, B, C, L, M and N in order to set an appropriate value for T3, a configuration can be implemented in which Moiré is eliminated or significantly reduced in intensity.

The above explanation uses an example in which the parallax barrier has a vertical stripe type structure, but alternatively the parallax barrier may have a slanting (diagonal) type structure such as explained in the first embodiment.

In FIG. 8, regions 0, 1 and 2 are each configured using a liquid-crystal material or the like such that masking ratio and aperture ratio (light-transmittance) thereof can be varied through application of electrical voltage. Alternatively, in order that region 0 is constantly in a transmitting state (100% light-transmittance), region 0 may be provided as a constant aperture or a material through which transmittance of light is approximately complete, such as glass, may be provided in region 0. In the above configuration, only regions 1 and 2 are configured such that masking ratio and aperture ratio (light-transmittance) thereof can be varied through application of electrical voltage.

The present embodiment is explained using an example in which the image display is a PDP, but the image display may alternatively be a different type of display such as an LCD or an EL display.

The present embodiment is explained using an example of configuration in which the image separator is located in front of a front surface of the image display, but in an alternative configuration the image separator may be a parallax barrier which is located between a liquid-crystal panel and a backlight of an LCD. Furthermore, in an alternative configuration only region 2, which implements a region with average light-transmittance T3% during one cycle, may be configured using a liquid-crystal material or the like such that light-transmittance thereof can be varied through application of electrical voltage. In the above configuration, region 0 is provided as an aperture portion which is constantly in the transmitting state and a fixed structure (for example, masked glass or film) is provided in region 1 such that region 1 is constantly in the masking state.

Fourth Embodiment

Figure 9:
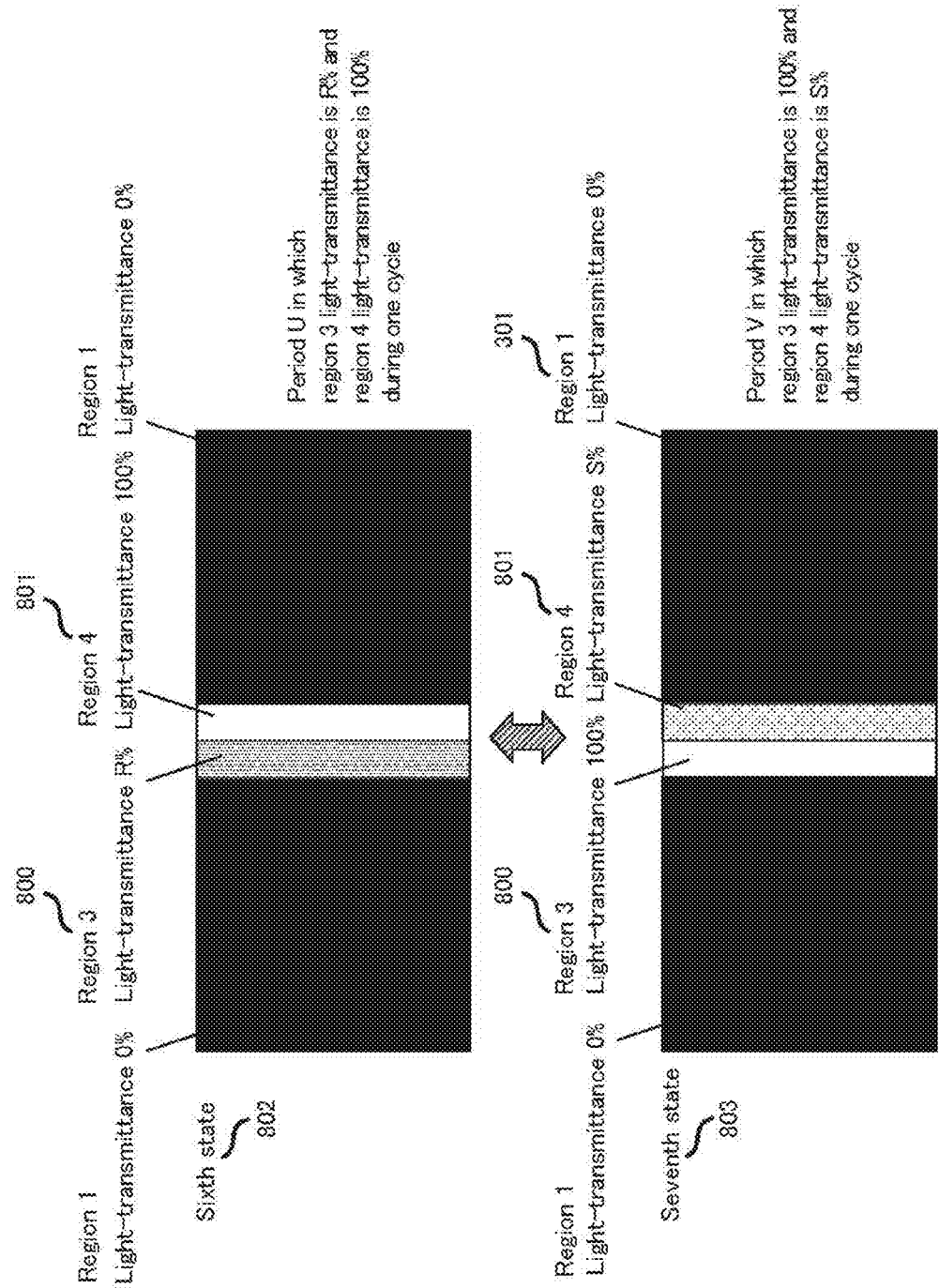
FIG. 9 is a schematic diagram illustrating separator adjustment in the image display device relating to the fourth embodiment.

FIGS. 1, 6, 9, and 10 illustrate the fourth embodiment. FIG. 9 is a schematic diagram of barrier adjustment when a vertical stripe parallax barrier is used to implement an image separator in the fourth embodiment. In the same way as in the first embodiment, region 1 and also regions 3 and 4 are each configured (for example, using a TFT liquid-crystal material) such that masking ratio and aperture ratio (light-transmittance) thereof can be varied through application of electrical voltage.

In the present embodiment, the parallax barrier is configured by regions 1, 3 and 4, and a central position of an aperture portion changes between two different states (sixth state and seventh state) of the parallax barrier. Furthermore, the parallax barrier can perform high-speed switching between the two states. Through the above, there is high-speed switching of position at which Moiré occurs, thus Moiré can be eliminated or significantly reduced in intensity. Preferably the high-speed switching should be performed so as to be imperceptible to a user. For example, switching between the two states is performed at a frequency in a range of 120 Hz to 240 Hz. Average light-transmittances T33% and T34% of regions 3 and 4 respectively during one cycle in cyclic repetition of the two states is determined by a ratio of time in the sixth state to time in the seventh state (duty ratio of the sixth state and the seventh state) and light-transmittances of regions 3 and 4 in each of the aforementioned states. For example, if in the sixth state region 3 has light-transmittance R % and region 4 has light-transmittance 100%, in the seventh state region 3 has light-transmittance 100% and region 4 has light-transmittance S %, and a duty ratio of the sixth state and the seventh state is U:V, the average light-transmittances T33% and T34% are as shown below in MATH 3.

[MATH 3]

$$T33=(R\times U+100\times V)(U+V)$$

$$T34=(R\times 100+S\times V)/(U+V) \quad (3)$$

A feature of the present embodiment is that through switching between the sixth state and the seventh state, average light-transmittance can be adjusted, and additionally central position of the aperture portion can also be varied.

Figure 18:
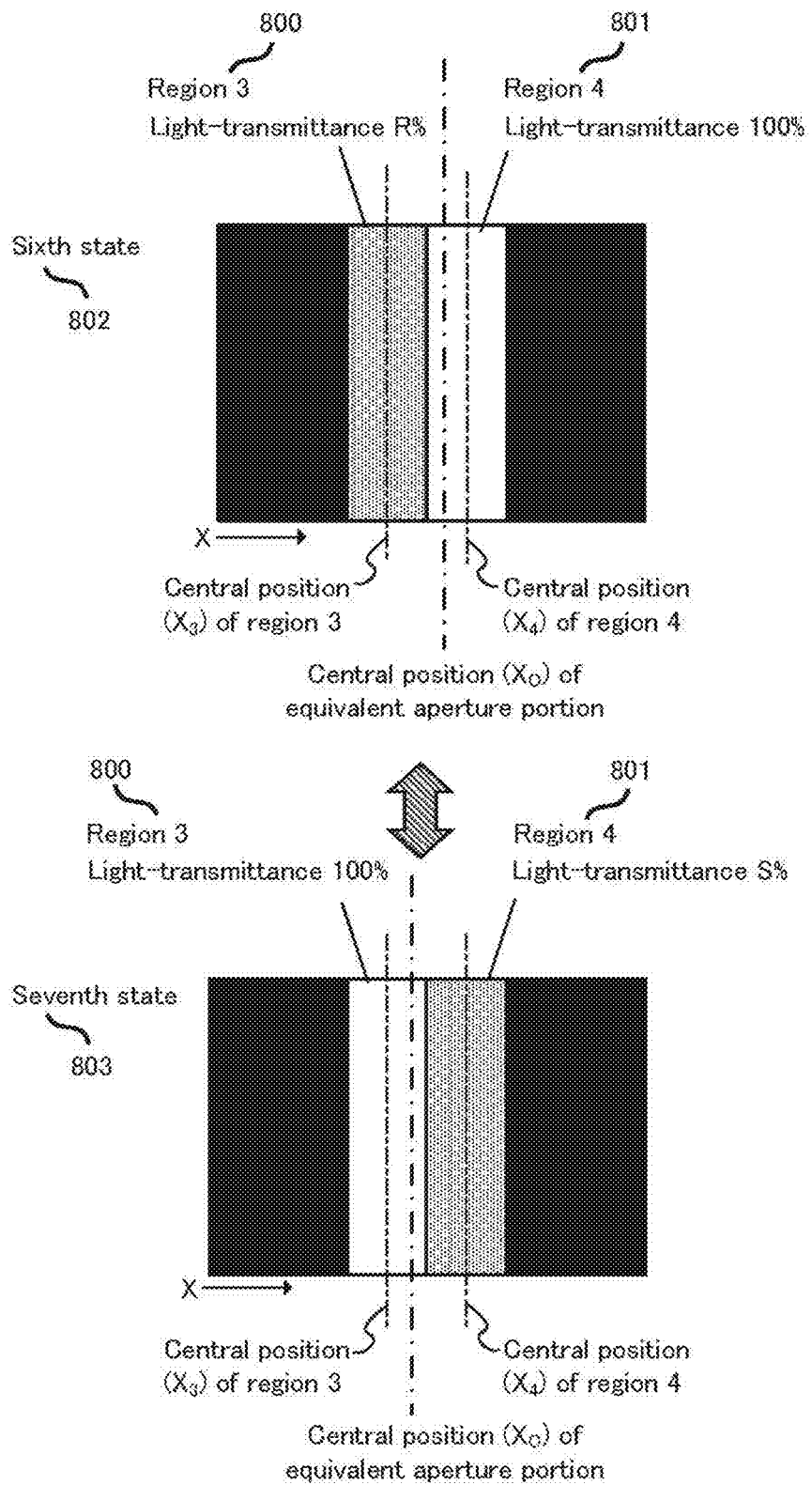
FIG. 18 is a schematic diagram illustrating a central position of an aperture portion in the image display device relating to the fourth embodiment.

In other words, as illustrated in FIG. 18, in the sixth state a central position of region 3 has a coordinate $X_3$ and a central position of region 4 has a coordinate $X_4$, thus a central position $X_O$ of the aperture portion is as shown below in MATH 4.

[MATH 4]

$$X_O=(X_3\times R+X_4\times 100)/(R+100) \quad (4)$$

The central position $X_O$ is a central position of an equivalent aperture portion. For example, when the light-transmittance R % is 50%, the central position $X_O$ is equivalent to a central position of an aperture portion formed when in FIG. 18 a left side of region 3, which is 50% of region 3, masks light and a right side of region 3, which is the other 50% of region 3, transmits light.

In the same way as described above, in the seventh state central position $X_O$ of the aperture portion is as shown below in MATH 5.

[MATH 5]

$$X_O=(X_3\times 100+X_4\times S)/(100+S) \quad (5)$$

As explained above, in the fourth embodiment central position of the aperture portion can be varied, enabling adaptation for various different types of stereoscopic display such as head tracking stereoscopic display.

Figure 10:
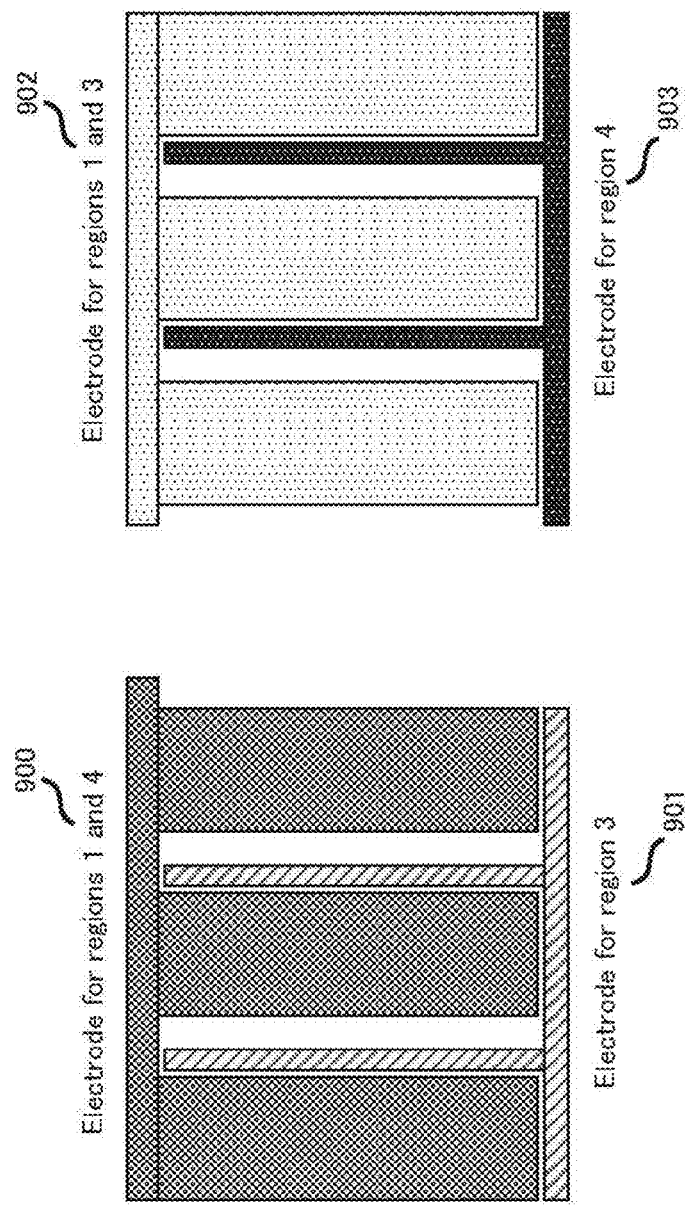
FIG. 10 illustrates an example of electrode structure for implementing separator adjustment in the image display device relating to the fourth embodiment.
Figure 11:
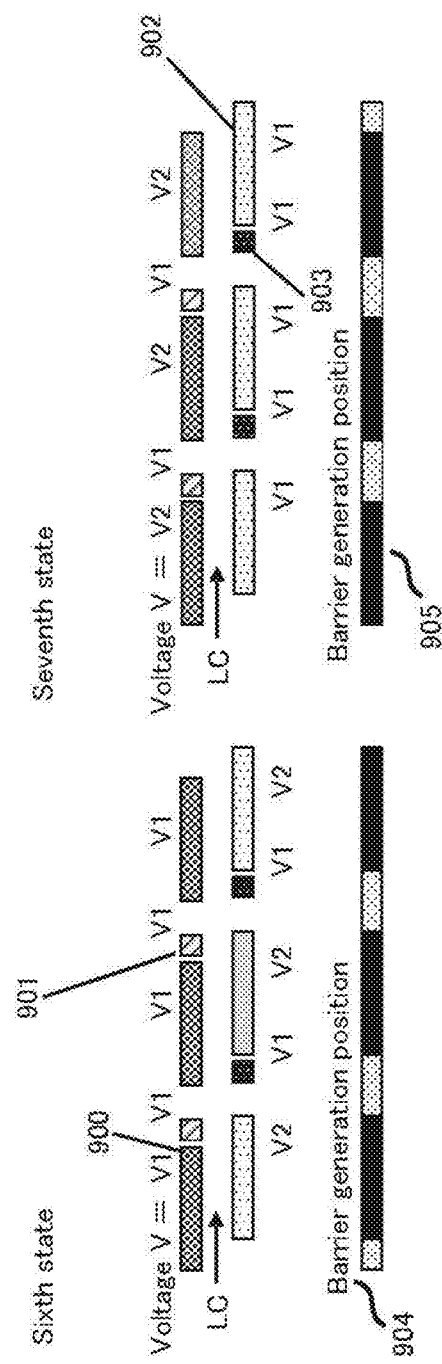
FIG. 11 is a schematic diagram illustrating barrier generation position during separator adjustment in the image display device relating to the fourth embodiment.

FIG. 10 illustrates an example of electrode structure for implementing barrier adjustment illustrated in FIG. 9. An electrode for regions 1 and 3 and an electrode for region 4 are formed on one substrate. An electrode for regions 2 and 4 and an electrode for region 3 are formed on another substrate. FIG. 11 illustrates, for the sixth and seventh states, electrical voltage which is applied and masking portions which are generated for the electrode structure illustrated in FIG. 10. In the sixth state, a voltage V1 is applied to the electrode for regions 1 and 4, the electrode for region 4 and the electrode for region 3, and a voltage V2, which differs from the voltage V1, is applied to the electrode for regions 1 and 3. Through the above, masking portions are generated in areas in which voltage differs between the opposing substrates. In other words, masking portions are generated in regions 1 and 3. In the seventh state, a voltage V1 is applied to the electrode for region 4, the electrode for regions 1 and 3, and the electrode for region 3, and a voltage V2, which differs from the voltage V1, is applied to the electrode for regions 1 and 4. Through the above, masking portions are generated in areas in which voltage differs between the opposing substrates. In other words, masking portions are generated in regions 1 and 4.

Alternatively, a voltage V3, which differs from the voltages V1 and V2, may be applied to the electrode for region 3 or the electrode for region 4 in order to control light-transmittance of the aforementioned region such that the light-transmittance is a value between 0% and 100%.

In the above explanation, light-transmittance of region 4 is 100% in the sixth state and light-transmittance of region 3 is 100% in the seventh state, but alternatively region 4 may have light-transmittance X % (X>R, 50≤x≤100) in the sixth state and region 3 may have light-transmittance Y % (Y>S, 50≤y≤100) in the seventh state.

The above explanation uses an example in which the parallax barrier has a vertical stripe type structure, but alternatively the parallax barrier may have a slanting (diagonal) type structure such as explained in the first embodiment.

In FIG. 9, regions 1, 3 and 4 are each configured using a liquid-crystal material or the like such that masking ratio and aperture ratio (light-transmittance) thereof can be varied through application of electrical voltage. Alternatively, in order that region 1 is constantly in the masking state (0% light-transmittance), a fixed structure (for example, masked glass or film) may be provided in region 1. In the above configuration, only regions 3 and 4 are configured such that masking ratio and aperture ratio (light-transmittance) thereof can be varied through application of electrical voltage.

The present embodiment is explained using an example in which the image display is a PDP, but the image display may alternatively be a different type of display such as an LCD or an EL display.

The present embodiment is explained using an example of configuration in which the image separator is located in front of a front surface of the image display, but in an alternative configuration the image separator may be a parallax barrier which is located between a liquid-crystal panel and a backlight of an LCD.

Figure 12:
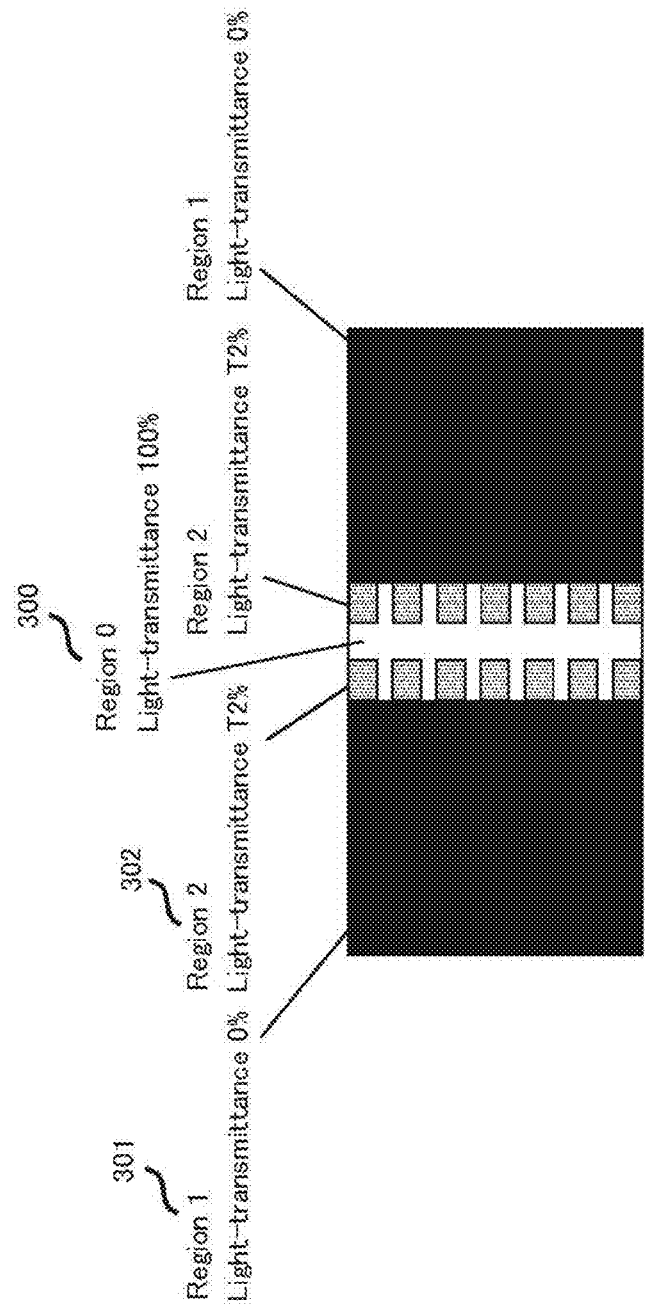
FIG. 12 illustrates a configuration in which in the image display device relating to the first embodiment, barrier structure in region 2 is implemented as a plurality of rectangular sub-divisions.

Modified Examples (1) In the image display device explained above in the first embodiment, alternatively shape of region 2, light-transmittance of which can be varied through application of electrical voltage, may be a comb-shape characterized by region 2 including groups of rectangular sub-divisions such as illustrated in FIG. 12. In the above configuration, by adopting an appropriate comb-shape in accordance with pixel structure, pixel size, black matrix and the like, Moiré can be further reduced without changing average aperture ratio relative to the first embodiment. In the same way as explained above, in the second embodiment and the third embodiment, shape of region 2, light-transmittance of which can be varied through application of electrical voltage, may be a comb-shape characterized by region 2 including groups of rectangular sub-divisions such as illustrated in FIGS. 13 and 14 for the second and third embodiments respectively.

Figure 13:
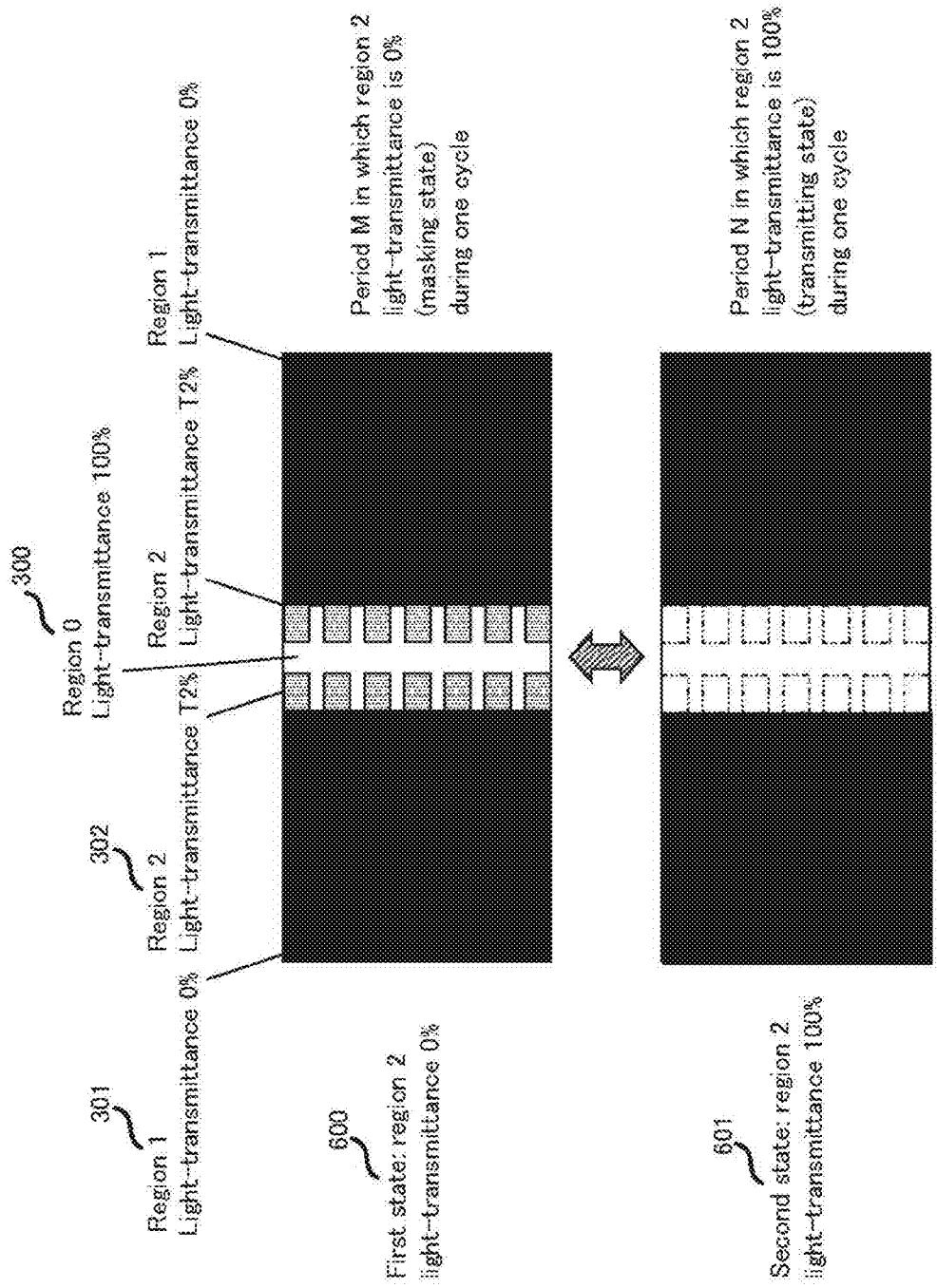
FIG. 13 illustrates a configuration in which in the image display device relating to the second embodiment, barrier structure in region 2 is implemented as a plurality of rectangular sub-divisions.
Figure 14:
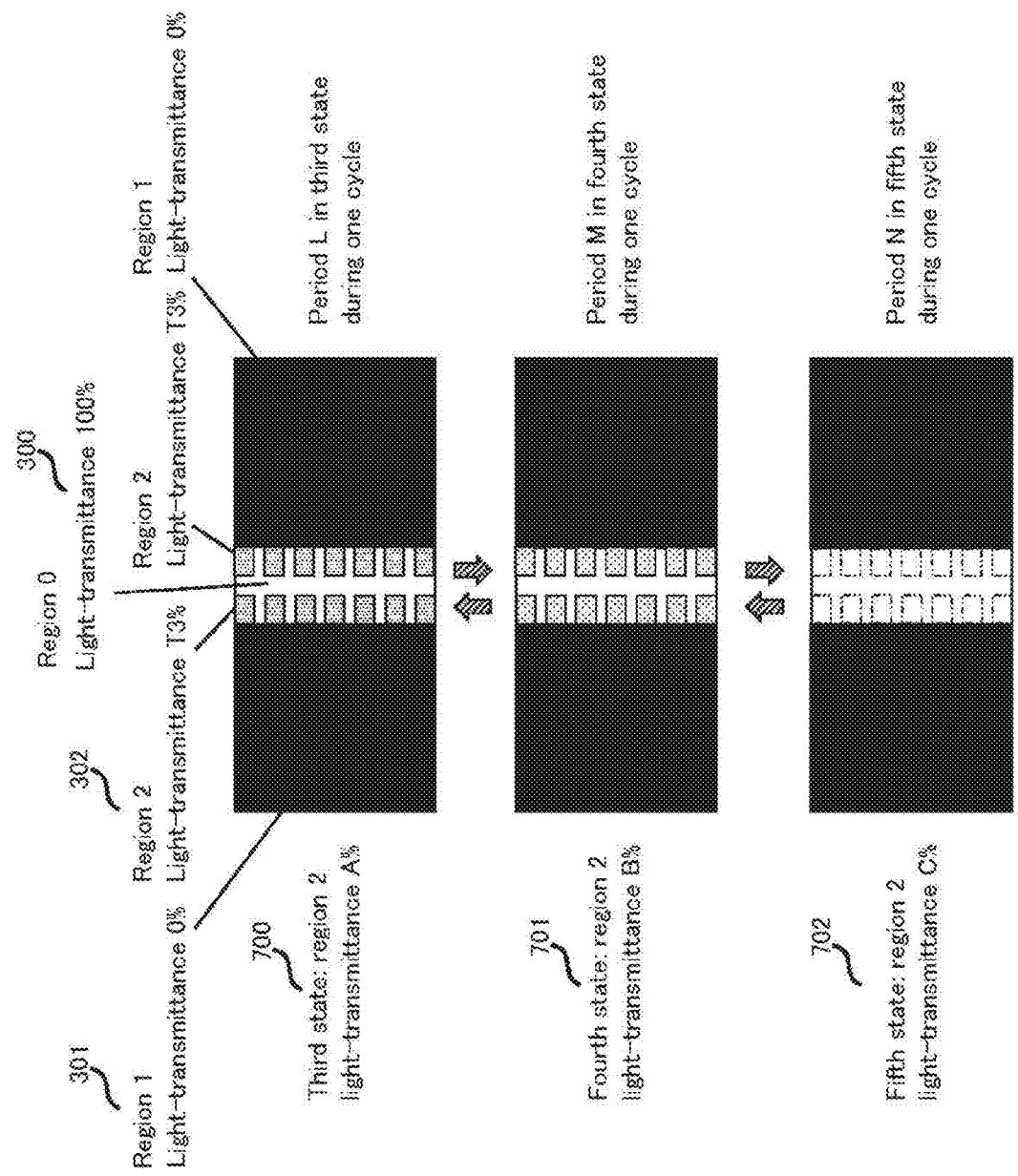
FIG. 14 illustrates a configuration in which in the image display device relating to the third embodiment, barrier structure in region 2 is implemented as a plurality of rectangular sub-divisions.

In FIG. 13, region 2 is configured by groups of rectangular sub-divisions located at opposite edges of an elongated aperture portion (region 0). Each of the groups of rectangular sub-divisions consists of a plurality of rectangular sub-divisions which are arranged along the corresponding edge with fixed intervals therebetween.

Figure 15:
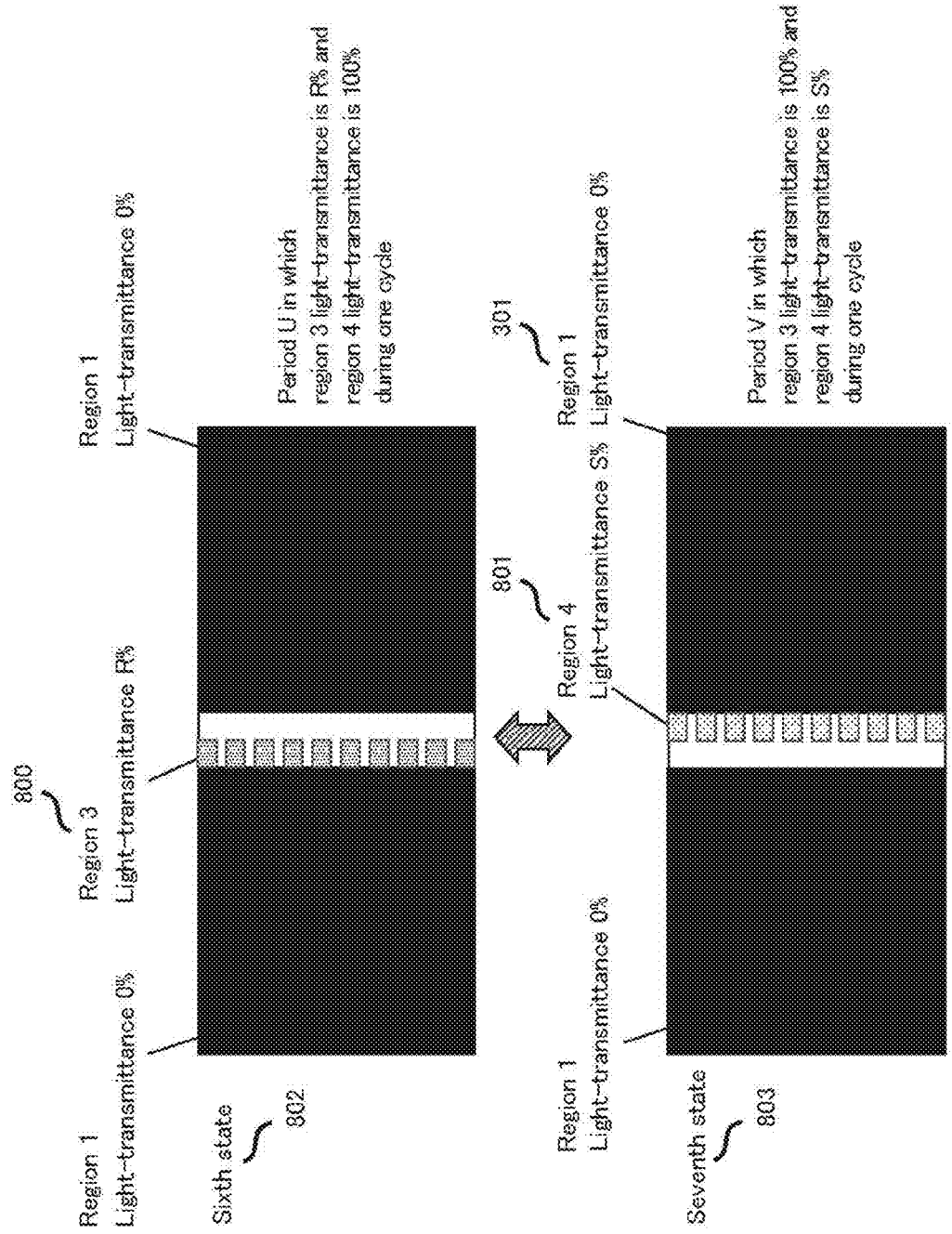
FIG. 15 illustrates a configuration in which in the image display device relating to the fourth embodiment, barrier structure in regions 3 and 4 is implemented as a plurality of rectangular sub-divisions.
Figure 16:
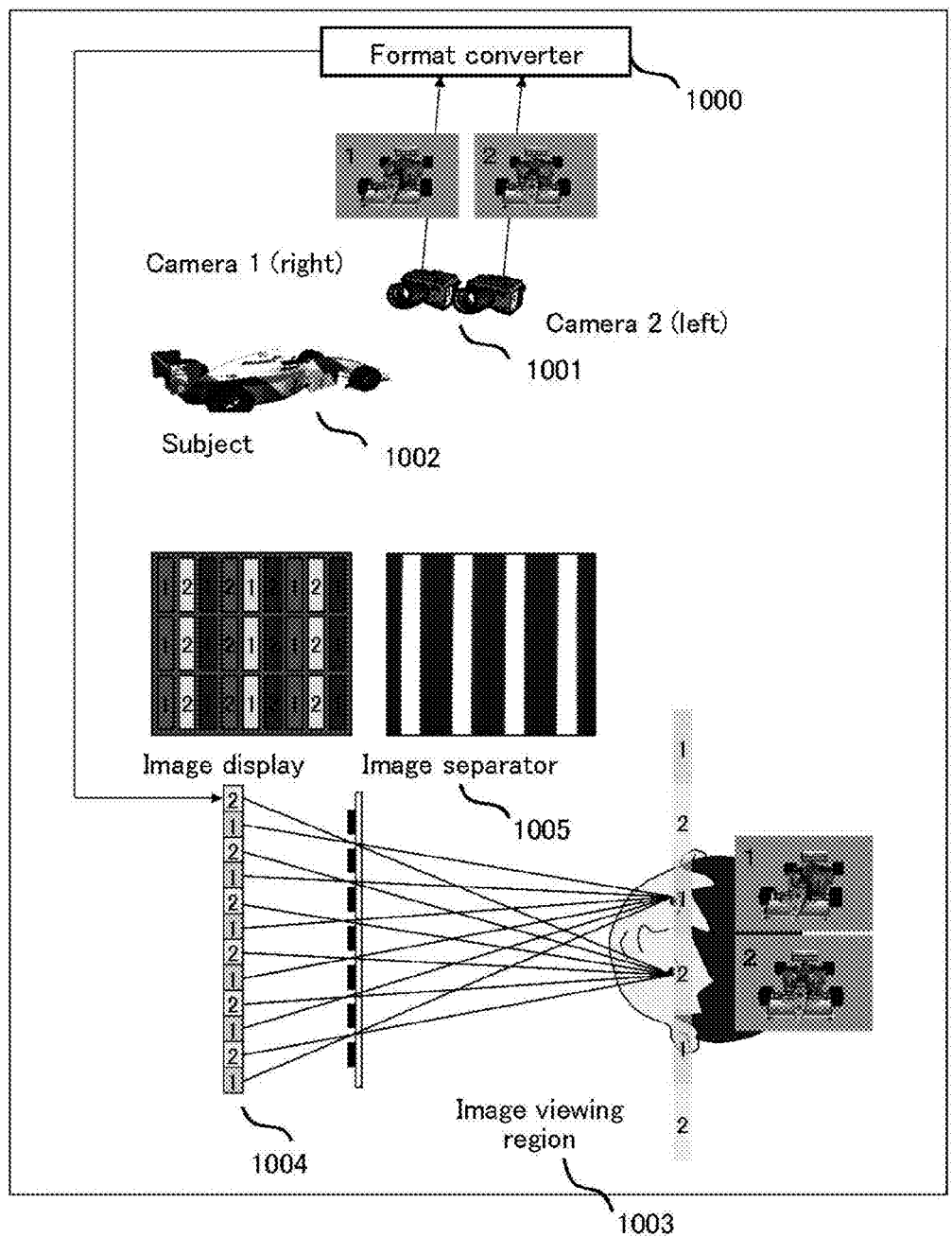
FIG. 16 illustrates configuration of a conventional image display device relating to prior art.

In the same way as explained above, in the fourth embodiment, shapes of regions 3 and 4, light-transmittance of which can be varied through application of electrical voltage, may each be a comb-shape characterized by regions 3 and 4 each including a group of rectangular sub-divisions such as illustrated in FIG. 15.

Instead of the groups of rectangular sub-divisions illustrated in FIGS. 12, 13, 14 and 15, the comb-shape may alternatively be composed by a complicated sub-divided structure, for example including a plurality of triangular sub-divisions or a plurality of trapezoid sub-divisions which are implemented using a liquid-crystal material or the like, light-transmittance of which can be varied through application of electrical voltage.

(2) In the image display devices explained in the above embodiments, the image display 100 for displaying parallax images may be an LCD which uses a backlight as a light source, a PDP or organic EL panel which is self-lighting, or any other display which can be adapted to display pixel columns of parallax images.

(3) Furthermore, the image display device may use results of detection of a head position using a camera image or a plurality of camera images, and thus may perform dynamic adjustment of parameters such as barrier pitch and barrier-display panel separation in combination with head tracking, eye tracking or the like. Alternatively, instead of using images, distance to a target object may be measured using a TOF (Time Of Flight) method in which light is emitted toward the target object from a light source, such as an LED light source, and TOF is measured as a time until the light is reflected back from the subject. Further alternatively, tracking is possible using a wired connection device which measures 3D position using electromagnetic power or the like.

(4) Alternatively, a tracking method may be adopted in which a predetermined test pattern is constantly displayed, and geometrical measurements are made based on size of test pattern portions, variation in pixel value Moiré or the like.

(5) Explanation in section (3) is for detection of position of a head of a person, but alternatively results of extraction of a pupil or eye region from an image of a whole body of a person may be used.

When controlling pixel column arrangement of parallax images in accordance with head position, real-time calculation control using a CPU (Central Processing Unit), GPU (Graphics Processing Unit) or the like is possible, or alternatively control may be performed by selection from a predetermined LUT (Look-Up Table).

(6) In the second, third and fourth embodiments in which high-speed switching between states is performed, frequency of switching is explained as being in a range of 120 Hz to 240 Hz, but the frequency of switching is not limited to the aforementioned range.

A lower limit for the frequency of switching is of a magnitude at which switching becomes imperceptible to a viewer. For example, the lower limit may be 50 Hz.

(7) In FIGS. 3 and 5 of the first embodiment, region 2 which has variable light-transmittance T % is located between region 1 and region 0. Alternatively, region 2 may be split into region 2a of light-transmittance T1% and region 2b of light-transmittance T2%, as illustrated in FIG. 19.

In particular, if T1<T2 then 0%<T1%<T2%<100% and thus change in light-transmittance between regions 0 and 1 occurs in a stepped configuration through regions 2a and 2b. Through the above, Moiré can be reduced in a manner which is less noticeable to a viewer.

(8) In the embodiments, an example is explained in which the image separator is located in front of a front surface of the image display, but an alternative configuration may be used in which the image separator is a parallax barrier which is located between a liquid-crystal panel and a backlight of an LCD and in which aperture width of the parallax barrier is controlled. Alternatively, by using a light source including light-emitting units in a striped pattern, the same effect can be achieved as when the image separator is implemented as the parallax barrier located between the liquid-crystal panel and the backlight of the LCD. In the above configuration, the light-emitting units of the light source may have the same shape as aperture portions of the parallax barrier used to implement the image separator in the present invention, which is located between the liquid-crystal panel and the backlight of the LCD. Alternatively, the same effects as the present invention may be achieved through a combination of one or more regions in which an amount of light emitted from the light source is fixed and one or more regions in which an amount of light emitted from the light source can be varied.

[Supplementary Explanation]

The following aspects are included in embodiments of the present invention.

(A) An image display device relating to one embodiment of the present invention comprises: an image display configured to display a plurality of parallax images; an image separator configured to perform optical separation such that the plurality of parallax images which are displayed are viewed as a stereoscopic image, the image separator including a light-transmitting region, a light-masking region and an intermediate region which is located between the light-transmitting region and the light-masking region; and a controller configured to control light-transmittance of the intermediate region.

(B) In the image display device of section (A), the controller may control the light-transmittance of the intermediate region by high-speed switching of a state of the intermediate region between a first state, in which the intermediate region has a first light-transmittance, and a second state, in which the intermediate region has a second light-transmittance that differs from the first light-transmittance.

Through the above configuration, Moiré can be eliminated or significantly reduced in intensity by repeatedly performing the switching at a speed which is imperceptible to a viewer.

(C) In the image display device of section (B), the first light-transmittance may be 0% and the second light-transmittance may be 100%, and the controller may perform the switching by alternately switching between the first state and the second state.

(D) In the image display device of section (A), the intermediate region may include: a first region located at one edge of the light-transmitting region; and a second region located at an opposite edge of the light-transmitting region, and the controller may control the light-transmittance of the intermediate region by high-speed switching between a first state, in which light-transmittance R % of the first region satisfies $0 \leq R < 100$ and light-transmittance of the second region is 100%, and a second state, in which light-transmittance of the first region is 100% and light transmittance S % of the second region satisfies $0 \leq S < 100$.

Through the above configuration, a central position of an aperture portion which transmits light can be changed by switching between the first state and the second state, and thus Moiré can be eliminated or significantly reduced in intensity.

(E) In the image display device of section (D), the image separator may include a plurality of elongated aperture portions arranged in a striped pattern, the first region may include a group of sub-divisions located at one edge of each of the aperture portions in terms of a width direction thereof, the second region may include a group of sub-divisions located at an opposite edge of each of the aperture portions in terms of the width direction thereof, and each of the groups of sub-divisions may consist of a plurality of sub-divisions which are arranged in a direction perpendicular to the width direction with intervals therebetween.

(F) In the image display device of section (A), the image separator may include a plurality of elongated aperture portions arranged in a striped pattern, the intermediate region may include a group of sub-divisions located at one edge of each of the aperture portions in terms of a width direction thereof and a group of sub-divisions located at an opposite edge of each of the aperture portions in terms of the width direction thereof, and each of the groups of sub-divisions may consist of a plurality of sub-divisions which are arranged in a direction perpendicular to the width direction with intervals therebetween.

(G) In the image display device of section (A), the image separator may include a plurality of elongated aperture portions arranged in a slanted striped pattern, and the intermediate region may be provided in a slanted elongated shape at positions adjacent to each of two edges of each of the aperture portions in terms of a width direction thereof.

(H) An image display method relating to one embodiment of the present invention comprises: a display step of causing a display to display a plurality of parallax images; an image separation step of causing an image separator to perform optical separation such that the plurality of parallax images which are displayed are viewed as a stereoscopic image, the image separator including a light-transmitting region, a light-masking region and an intermediate region which is located between the light-transmitting region and the light-masking region; and a control step of controlling light-transmittance of the intermediate region.

INDUSTRIAL APPLICABILITY

Through the present invention, a region is provided which has light-transmittance that can be controlled, and which can be switched between a masking state (0% light-transmittance) and a transmitting state (100% light-transmittance). By controlling electrical voltage applied to the region having variable light-transmittance, Moiré can be significantly reduced in intensity, even after barrier manufacture.

Furthermore, in one embodiment of the present invention electrical voltage applied to the region having variable light-transmittance is controlled such that high-speed switching between a plurality of states of differing light-transmittance causes change in central position of an aperture portion, thus enabling reduction in Moiré by high-speed switching of position at which Moiré occurs.

REFERENCE SIGNS LIST 100 image display
101 image separator
102 viewing information
103 separator controller
105 separator information determination unit
106 separator adjustment circuit
107 display circuit
108 parallax images
200 aperture width-pitch determination sub-unit
201 target position initialization sub-unit
202 region recognition sub-unit
203 target position transmittance determination sub-unit
204 target position update sub-unit
300 region 0 of light-transmittance 100%
301 region 1 of light-transmittance 0%
302 region 2 of light-transmittance T %
302a region 2a of light-transmittance T1%
302b region 2b of light-transmittance T2%
400 electrode for region 1 in first embodiment
401 electrode for region 2 in first embodiment
402 opposing electrode
500 TLK signal
501 state judgment sub-unit
502 target position transmittance determination sub-unit
600 first state of barrier in second embodiment
601 second state of barrier in second embodiment
700 third state of barrier in third embodiment
701 fourth state of barrier in third embodiment
702 fifth state of barrier in third embodiment
800 region 3 of light-transmittance R %
801 region 4 of light-transmittance S %
802 sixth state of barrier in fourth embodiment
803 seventh state of barrier in fourth embodiment
900 electrode for regions 1 and 4 in fourth embodiment
901 electrode for region 3 in fourth embodiment
902 electrode for regions 1 and 3 in fourth embodiment
903 electrode for region 4 in fourth embodiment 904 barrier generation position for sixth state of barrier in fourth embodiment
905 barrier generation position for seventh state of barrier in fourth embodiment
1000 format converter
1001 camera
1002 subject
1003 image viewing region
1004 image display
1005 image separator
1100 dark area
1101 light area

The invention claimed is:

1. An image display device comprising:
an image display configured to display a plurality of parallax images;
an image separator configured to perform optical separation such that the plurality of parallax images which are displayed are viewed as a stereoscopic image, the image separator including a light-transmitting region, a light-masking region and an intermediate region which is located between the light-transmitting region and the light-masking region; and
a controller configured to control light-transmittance of the intermediate region, wherein
the light-transmitting region, the light-masking region, and the intermediate region are in a same plane as each other, the plane being parallel with a display surface of the image display,
the light-transmittance of the intermediate region is uniform,
the light-transmitting region, the light-masking region, and the intermediate region have predetermined widths such that a Moiré pattern occurring when the light-transmittance of the intermediate region is set to a first light-transmittance is a reverse of a Moiré pattern occurring when the light-transmittance of the intermediate region is set to a second light-transmittance, in terms of positions of dark areas and light areas, and
the controller sets the light-transmittance of the intermediate region to a light-transmittance that is between the first light-transmittance and the second light-transmittance and that is not the first light-transmittance or the second light-transmittance.

2. The image display device of claim 1, wherein
the image separator includes a plurality of elongated aperture portions arranged in a striped pattern,
the intermediate region includes a group of sub-divisions located at one edge of each of the aperture portions in terms of a width direction thereof and a group of sub-divisions located at an opposite edge of each of the aperture portions in terms of the width direction thereof, and
each of the groups of sub-divisions consists of a plurality of sub-divisions which are arranged in a direction perpendicular to the width direction with intervals therebetween.

3. The image display device of claim 1, wherein
the image separator includes a plurality of elongated aperture portions arranged in a slanted striped pattern, and
the intermediate region is provided in a slanted elongated shape at positions adjacent to each of two edges of each of the aperture portions in terms of a width direction thereof.

4. An image display device comprising:
an image display configured to display a plurality of parallax images;
an image separator configured to perform optical separation such that the plurality of parallax images which are displayed are viewed as a stereoscopic image, the image separator including a light-transmitting region, a light-masking region and an intermediate region which is located between the light-transmitting region and the light-masking region; and
a controller configured to control light-transmittance of the intermediate region, wherein
the light-transmitting region, the light-masking region, and the intermediate region are in a same plane as each other, the plane being parallel with a display surface of the image display,
the light-transmittance of the intermediate region is uniform,
the light-transmitting region, the light-masking region, and the intermediate region have predetermined widths such that a Moiré pattern occurring when the light-transmittance of the intermediate region is set to a first light-transmittance is a reverse of a Moiré pattern occurring when the light-transmittance of the intermediate region is set to a second light-transmittance, in terms of positions of dark areas and light areas, and
the controller controls the light-transmittance of the intermediate region by high-speed switching of a state of the intermediate region between a first state, in which the intermediate region has the first light-transmittance, and a second state, in which the intermediate region has the second light-transmittance.

5. The image display device of claim 4, wherein
the first light-transmittance is 0% and the second light-transmittance is 100%, and
the controller performs the switching by alternately switching between the first state and the second state.

6. An image display device comprising:
an image display configured to display a plurality of parallax images;
an image separator configured to perform optical separation such that the plurality of parallax images which are displayed are viewed as a stereoscopic image, the image separator including a light-transmitting region, a light-masking region and an intermediate region which is located between the light-transmitting region and the light-masking region; and
a controller configured to control light-transmittance of the intermediate region, wherein
the light-transmitting region, the light-masking region, and the intermediate region are in a same plane as each other, the plane being parallel with a display surface of the image display,
the light-transmittance of the intermediate region is uniform,
the light-transmitting region, the light-masking region, and the intermediate region have predetermined widths such that a Moiré pattern occurring when the light-transmittance of the intermediate region is set to a first light-transmittance is a reverse of a Moiré pattern occurring when the light-transmittance of the intermediate region is set to a second light-transmittance, in terms of positions of dark areas and light areas,
the intermediate region includes:
a first region located at one edge of the light-transmitting region; and
a second region located at an opposite edge of the light-transmitting region, and the controller controls the light-transmittance of the intermediate region by high-speed switching between a first state, in which light-transmittance R % of the first region satisfies 0≤R<100 and light-transmittance of the second region is 100%, and a second state, in which light-transmittance of the first region is 100% and light transmittance S % of the second region satisfies 0≤S<100.

7. The image display device of claim 6, wherein
the image separator includes a plurality of elongated aperture portions arranged in a striped pattern,
the first region includes a group of sub-divisions located at one edge of each of the aperture portions in terms of a width direction thereof,
the second region includes a group of sub-divisions located at an opposite edge of each of the aperture portions in terms of the width direction thereof, and
each of the groups of sub-divisions consists of a plurality of sub-divisions which are arranged in a direction perpendicular to the width direction with intervals therebetween.

8. An image display method comprising:
a display step of causing a display to display a plurality of parallax images;
an image separation step of causing an image separator to perform optical separation such that the plurality of parallax images which are displayed are viewed as a stereoscopic image, the image separator including a light-transmitting region, a light-masking region and an intermediate region which is located between the light-transmitting region and the light-masking region; and
a control step of controlling light-transmittance of the intermediate region, wherein
the light-transmitting region, the light-masking region, and the intermediate region are in a same plane as each other, the plane being parallel with a display surface of the display,
the light-transmittance of the intermediate region is uniform,
the light-transmitting region, the light-masking region, and the intermediate region have predetermined widths such that a Moiré pattern occurring when the light-transmittance of the intermediate region is set to a first light-transmittance is a reverse of a Moiré pattern occurring when the light-transmittance of the intermediate region is set to a second light-transmittance, in terms of positions of dark areas and light areas, and
in the control step, the light-transmittance of the intermediate region is set to a light-transmittance that is between the first light-transmittance and the second light-transmittance and that is not the first light-transmittance or the second light-transmittance.

\* \* \* \* \*